United States Patent  
Abbott et al.

(10) Patent No.: US 7,272,723 B1
(45) Date of Patent: Sep. 18, 2007

(54) USB-COMPLIANT PERSONAL KEY WITH INTEGRAL INPUT AND OUTPUT DEVICES

(75) Inventors: Shawn D. Abbott, Calgary (CA); Bahram Afghani, Laguna Beach, CA (US); Mehdi Sotoodeh, Mission Viejo, CA (US); Norman L. Denton, III, Dana Point, CA (US); Calvin W. Long, Arcadia, CA (US)

(73) Assignee: SafeNet, Inc., Belcamp, MD (US)

( * ) Notice: Subject to any disclaimer, the term of this patent is extended or adjusted under 35 U.S.C. 154(b) by 0 days.

(21) Appl. No.: 09/449,159

(22) Filed: Nov. 24, 1999

Related U.S. Application Data

(63) Continuation-in-part of application No. 09/281,017, filed on Mar. 30, 1999.

(60) Provisional application No. 60/116,006, filed on Jan. 15, 1999.

(51) Int. Cl.
*H04K 1/00* (2006.01)
*H04L 9/00* (2006.01)
*G06F 11/30* (2006.01)
*G06F 15/173* (2006.01)
*G06F 15/16* (2006.01)

(52) U.S. Cl. .................. 713/185; 713/156; 713/159; 713/172; 713/173; 713/193; 713/194; 713/200; 713/201; 713/202; 709/223; 709/224; 709/225; 709/226; 709/227; 709/228; 709/229

(58) Field of Classification Search ............... 713/156, 713/159, 172–173, 182, 185, 200–202, 193–194; 709/223–229; 380/200–201; 705/56; 726/2, 726/3, 9, 20–21, 26

See application file for complete search history.

(56) References Cited

U.S. PATENT DOCUMENTS 4,799,258 A * 1/1989 Davies ................ 713/159

(Continued)

FOREIGN PATENT DOCUMENTS

EP     0 587 375     3/1994

(Continued)

OTHER PUBLICATIONS

Weston and Wehrmacher, http://www.itsecurity.com/asktecs/may901.*

(Continued)

*Primary Examiner*—Ayaz Sheikh
*Assistant Examiner*—Jenise Jackson
(74) *Attorney, Agent, or Firm*—Venable; James R. Burdett

(57) ABSTRACT

A compact, self-contained, personal key is disclosed. The personal key comprises a USB-compliant interface releaseably coupleable to a host processing device; a memory; and a processor. The processor provides the host processing device conditional access to data storable in the memory as well as the functionality required to manage files stored in the personal key and for performing computations based on the data in the files. In one embodiment, the personal key also comprises an integral user input device and an integral user output device. The input and output devices communicate with the processor by communication paths which are independent from the USB-compliant interface, and thus allow the user to communicate with the processor without manifesting any private information external to the personal key.

70 Claims, 10 Drawing Sheets

U.S. PATENT DOCUMENTS

| | | | | |
|---|---|---|---|---|
| 4,838,404 A | * | 6/1989 | Smith et al. | 194/212 |
| 5,032,708 A | * | 7/1991 | Comerford et al. | 235/492 |
| 5,146,068 A | * | 9/1992 | Ugawa et al. | 235/441 |
| 5,347,580 A | * | 9/1994 | Molva et al. | 713/159 |
| 5,432,851 A | * | 7/1995 | Scheidt et al. | 713/184 |
| 5,657,388 A | * | 8/1997 | Weiss | 713/185 |
| 5,706,426 A | * | 1/1998 | Hsu | 713/200 |
| 5,757,918 A | * | 5/1998 | Hopkins | 705/67 |
| 5,778,071 A | * | 7/1998 | Caputo et al. | 713/159 |
| 5,784,581 A | * | 7/1998 | Hannah | 710/110 |
| 5,815,577 A | * | 9/1998 | Clark | 380/52 |
| 5,857,024 A | | 1/1999 | Nishino et al. | |
| 6,084,967 A | * | 7/2000 | Kennedy et al. | 380/247 |
| 6,092,202 A | | 7/2000 | Veil et al. | |
| 6,128,741 A | * | 10/2000 | Goetz et al. | 713/200 |
| 6,189,099 B1 | * | 2/2001 | Rallis et al. | 713/172 |
| 6,351,271 B1 | * | 2/2002 | Mainwaring et al. | 715/744 |
| 6,401,205 B1 | * | 6/2002 | Rallis et al. | 713/172 |
| 6,425,084 B1 | * | 7/2002 | Rallis et al. | 713/185 |
| 6,434,700 B1 | * | 8/2002 | Alonso et al. | 713/169 |
| 6,523,119 B2 | * | 2/2003 | Pavlin et al. | 713/192 |
| 6,557,104 B2 | * | 4/2003 | Vu et al. | 713/189 |

FOREIGN PATENT DOCUMENTS

| | | |
|---|---|---|
| EP | 0 791 877 A1 | 8/1997 |
| GB | 2 154 344 A | 9/1985 |

OTHER PUBLICATIONS

Aladdin, Dec. 1997, http://web.archive.org/web/19980208082834/www.aks.com.*

Kobielus, Sep. 9, 1996 Network World.*

Backman, 1998, Network Computing, n 905, p. 152.*

Duksta, Aug. 24, 1998, Network World, p. 35.*

Gengler, Dec. 1995, InternetWork, v 6, n 12, p. S8(2).*

Rainbow Sees New Sales After Government Approvals, Mar. 27, 2000, v 14, iss 6.*

DiDio, Mar. 25, 1996, Computerworld, p. 64.*

RSA Data Security Acquiredd by Smart Token, Apr. 22, 1996, vol. 10, iss 8.*

UK-Security Dynamics Offers Remote Access Technology, Mar. 26, 1996.*

Troshinsky, May 26, 1997, BRP Publications, vol. 11, iss. 10.*

Security—Rainbow Technologies iKey 2000, Mar. 20, 2000, Network Computing, 36.*

Guida, May 3, 1999, Government Computer News, 18, 13, 46(1).*

Cray, Nov. 1997, Data Communications, v26, n15, p. 87(8).*

Greenmeier, Oct. 24, 1997, MIDRANGE Systems, v10, n17, p. 13(1).*

WIBU-Systems AG, "WIBU-KEY User's Guide Version 2.50", Jul. 1998, XP002139265, Internet: <URL:ftp:/ /www2.wibu.de/pub/download/us/UG250US.pdf>, pp. 12-14, 163-164.

Rainbow Technologies, News Release, "Rainbow Technologies Adds USB Support For PC And Macintosh Software Developers To Sentinel Line," Nov. 17, 1998, XP002139273, Internet: http://www.rainbow.com/invest/PR981117b.html (2 pages).

* cited by examiner

USB-COMPLIANT PERSONAL KEY WITH INTEGRAL INPUT AND OUTPUT DEVICES

CROSS-REFERENCE TO RELATED APPLICATIONS

This application is a continuation-in-part of U.S. patent application Ser. No. 09/281,017, filed Mar. 30, 1999 by Shawn D. Abbott, Barham Afghani, Allan D. Anderson, Patrick N. Godding, Maarten G. Punt, and Mehdi Sotoodeh, and entitled "USB-Compliant Personal Key," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, and entitled "USB-Compliant Personal Key," both of which applications are hereby incorporated by reference herein.

BACKGROUND OF THE INVENTION

1. Field of the Invention

The present invention relates to computer peripherals, and in particular to a personal key having input and output devices integrated therewith to provide for increased security.

2. Description of the Related Art

In the last decade, the use of personal computers in both the home and in the office have become widespread. These computers provide a high level of functionality to many people at a moderate price, substantially surpassing the performance of the large mainframe computers of only a few decades ago. The trend is further evidenced by the increasing popularity of laptop and notebook computers, which provide high-performance computing power on a mobile basis.

The widespread availability of personal computers has had a profound impact on interpersonal communications as well. Only a decade ago, telephones or fax machines offered virtually the only media for rapid business communications. Today, a growing number of businesses and individuals communicate via electronic mail (e-mail). Personal computers have also been instrumental in the emergence of the Internet and its growing use as a medium of commerce.

While certainly beneficial, the growing use of computers in personal communications, commerce, and business has also given rise to a number of unique challenges.

First, the growing use of computers has resulted in extensive unauthorized use and copying of computer software, costing software developers substantial revenue. Although unauthorized copying or use of software is a violation of the law, the widespread availability of pirated software and enforcement difficulties have limited the effectiveness of this means of preventing software piracy.

Software developers and computer designers alike have sought technical solutions to attack the problem of software piracy. One solution uses an external device known as a hardware key, or "dongle" coupled to an input/output (I/O) port of the host computer.

While the use of such hardware keys is an effective way to reduce software piracy, to date, their use has been substantially limited to high value software products. Hardware keys have not been widely applied to popular software packages, in part, because the hardware keys are too expensive, and in part, because there is a reluctance on the part of the application program user to bother with a hardware key whenever use of the protected program is desired. Also, in many cases, the hardware keys are designed for use with only one application. Hence, where the use of multiple applications on the same computer is desired, multiple hardware keys must be operated at the same time.

While it reflects a tremendous advance over telephones and facsimile machines, e-mail also has its problems. One of these problems involves security. Telephone lines are relatively secure and a legally sanctioned way to engage in the private transmission of information, however, e-mails are generally sent over the Internet with no security whatsoever. Persons transmitting electronic messages must be assured that their messages are not opened or disclosed to unauthorized persons. Further, the addressee of the electronic message should be certain of the identity of the sender and that the message was not tampered with at some point during transmission.

Although the packet-switching nature of Internet communications helps to minimize the risk of intercepted communications, it would not be difficult for a determined interloper to obtain access to an unprotected e-mail message.

Many methods have been developed to secure the integrity of electronic messages during transmission. Simple encryption is the most common method of securing data. Both secret key encryption such as DES (Data Encryption Standard) and public key encryption methods that use both a public and a private key are implemented. Public and private key encryption methods allow users to send Internet and e-mail messages without concern that the message will be read by unauthorized persons or that its contents will be tampered with. However, key cryptographic methods do not protect the receiver of the message, because they do not allow the recipient to authenticate the validity of the public key or to validate the identity of the sender of the electronic message.

The use of digital certificates presents one solution to this problem. A digital certificate is a signed document attesting to the identity and public key of the person signing the message. Digital certificates allow the recipient to validate the authenticity of a public key. However, the typical user may use e-mail to communicate with hundreds of persons, and may use any one of several computers to do so. Hence, a means for managing a number of digital certificates across several computer platforms is needed.

Internet commerce raises other challenges. Users seeking to purchase goods or services using the Internet must be assured that their credit card numbers and the like are safe from compromise. At the same time, vendors must be assured that services and goods are delivered only to those who have paid for them. In many cases, these goals are accomplished with the use of passwords. However, as Internet commerce becomes more commonplace, customers are finding themselves in a position where they must either decide to use a small number of passwords for all transactions, or face the daunting task of remembering multiple passwords. Using a small number of passwords for all transactions inherently compromises security, since the disclosure of any of the passwords may lead to a disclosure of the others. Even the use of a large number of passwords can lead to compromised security. Because customers commonly forget their password, many Internet vendors provide an option whereby the user can be reminded of their password by providing other personal information such as their birthplace, mother's maiden name, and/or social security number. This feature, while often necessary to promote Internet commerce, severely compromises the password by relying on "secret" information that is in fact, publicly available.

Even in cases where the user is willing and able to keep track of a large number of passwords, the password security technique is often compromised by the fact that the user is inclined to select a password that is relatively easy to remember. It is indeed rare that a user selects a truly random password. What is needed is a means for generating and managing random passwords that can be stored and recalled for use on a wide variety of computer platforms.

Internet communications have also seen the increased use of "cookies." Cookies comprise data and programs that keep track of a user's patterns and preferences that can be downloaded from the Internet server for storage on the user's computer. Typically, cookies contain a range of addresses. When the browser encounters those addresses again, the cookies associated with the addresses are provided to the Internet server. For example, if a user's password were stored as a cookie, the use of the cookie would allow the user to request services or goods without requiring that the user enter the password again when accessing that service for the second and subsequent time.

However beneficial, cookies can also have their dark side. Many users object to storage of cookies on their computer's hard drive. In response to these concerns, Internet browser software allows the user to select an option so that they are notified before cookies are stored or used. The trouble with this solution is that this usually results in an excessive number of messages prompting the user to accept cookies. A better solution than this all-or-nothing approach would be to allow the storage and/or use of cookies, but to isolate and control that storage and use to comply with user-specified criteria.

Smartcards provide some of the above mentioned functionality, but smartcards do not present an ideal solution. First, personal keys are only valuable to the user if they offer a single, widely accepted secure repository for digital certificates and passwords. Smartcard readers are relatively expensive, and are not in wide use, at least in the United States, and are therefore unsuited to the task.

Second, smartcards do not provide for entering data directly into the card. This opens the smartcard to possible sniffer modules in malicious software, which can monitor the smartcard-reader interface to determine the user's personal identification or password information. This problem is especially problematic in situations where the user is using an unknown or untrusted smartcard reader. The lack of any direct input device also prevents the user from performing any smartcard-related functions in the relatively common situation where no smartcard reader is available.

Third, data cannot be accessed from the smartcard unless the smartcard is in the reader. This prevents the user from viewing data stored in the smartcard (i.e. a stored password) until a smartcard reader can be located. Given that smartcard readers (especially trusted ones) can be difficult to find, this substantially limits the usefulness of the card. Of course, the user may simply write the password down on paper, but this may compromise the security of all of the data in the card, and is inconsistent with the goal of providing a central, secure, portable repository for private data.

From the foregoing, it can be seen that there is a need for a personal key that allows the user to store and retrieve passwords and digital certificates without requiring the use of vulnerable external interfaces.

SUMMARY OF THE INVENTION

The present invention satisfies all of these needs with a personal key in a form factor that is compliant with a commonly available I/O interface such as the Universal Serial Bus (USB). The personal key includes a processor and a memory which implement software protection schemes to prevent copying and unauthorized use. The personal key provides for the storage and management of digital certificates, allowing the user to store all of his digital certificates in one media that is portable from platform to platform. The personal key provides for the generation, storage, and management of many passwords, providing additional security and relieving the user from the task of remembering multiple passwords. The personal key provides a means to store cookies and other Java-implemented software programs, allowing the user to accept cookies in a removable and secure form-factor. These features are especially useful when the present invention is used in a virtual private network (VPN). The present invention can also be used for several applications Because the personal key is capable of storing virtually all of the user's sensitive information, it is important that the personal key be as secure as possible. Hence, one embodiment of the personal key also comprises a biometric sensor disposed to measure biometrics such as fingerprint data. The biometric sensor measures characteristics of the person holding the key (such as fingerprints) to confirm that the person possessing the key is the actual owner of the key.

Since the personal key represents a single, secure repository for a great deal of the data the user will need to use and interact with a variety of computer platforms, it is also important that the personal key be able to interface (i.e., transmit and receive data) with a large variety of computers and computer peripherals. Hence, one embodiment of the personal key includes an electromagnetic wave transception device such as an infrared (IR) transceiver. This transceiver allows the personal key to exchange information with a wide variety of computers and peripherals without physical coupling.

The present invention is well suited for controlling access to network services, or anywhere a password, cookie, digital certificate, or smartcard might otherwise be used, including:

Remote access servers, including Internet protocol security (IPSec), point to point tunneling protocol (PPTP), password authentication protocol (PAP), challenge handshake authentication protocol (CHAP), remote access dial-in user service (RADIUS), terminal access controller access control system (TACACS);

Providing Extranet and subscription-based web access control, including hypertext transport protocol (HTTP), secure sockets layer (SSL);

Supporting secure online banking, benefits administration, account management;

Supporting secure workflow and supply chain integration (form signing);

Preventing laptop computer theft (requiring personal key for laptop operation);

Workstation logon authorization;

Preventing the modification or copying of software;

Encrypting files;

Supporting secure e-mail, for example, with secure multipurpose Internet mail extensions (S/MIME), and open pretty good privacy (OpenPGP)

Administering network equipment administration; and

Electronic wallets, with, for example, secure electronic transaction (SET, MilliCent, eWallet)

In one embodiment, the present invention comprises a compact, self-contained, personal token or key. The personal key comprises a USB-compliant interface releaseably coupleable to a host processing device; a memory; and a processor. The processor provides the host processing device conditional access to data storable in the memory as well as the functionality required to manage files stored in the personal key and for performing computations based on the data in the files. In one embodiment, the personal key also comprises an integral user input device and an integral user output device. The input and output devices communicate with the processor by communication paths which are independent from the USB-compliant interface, and thus allow the user to communicate with the processor without manifesting any private information external to the personal key.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
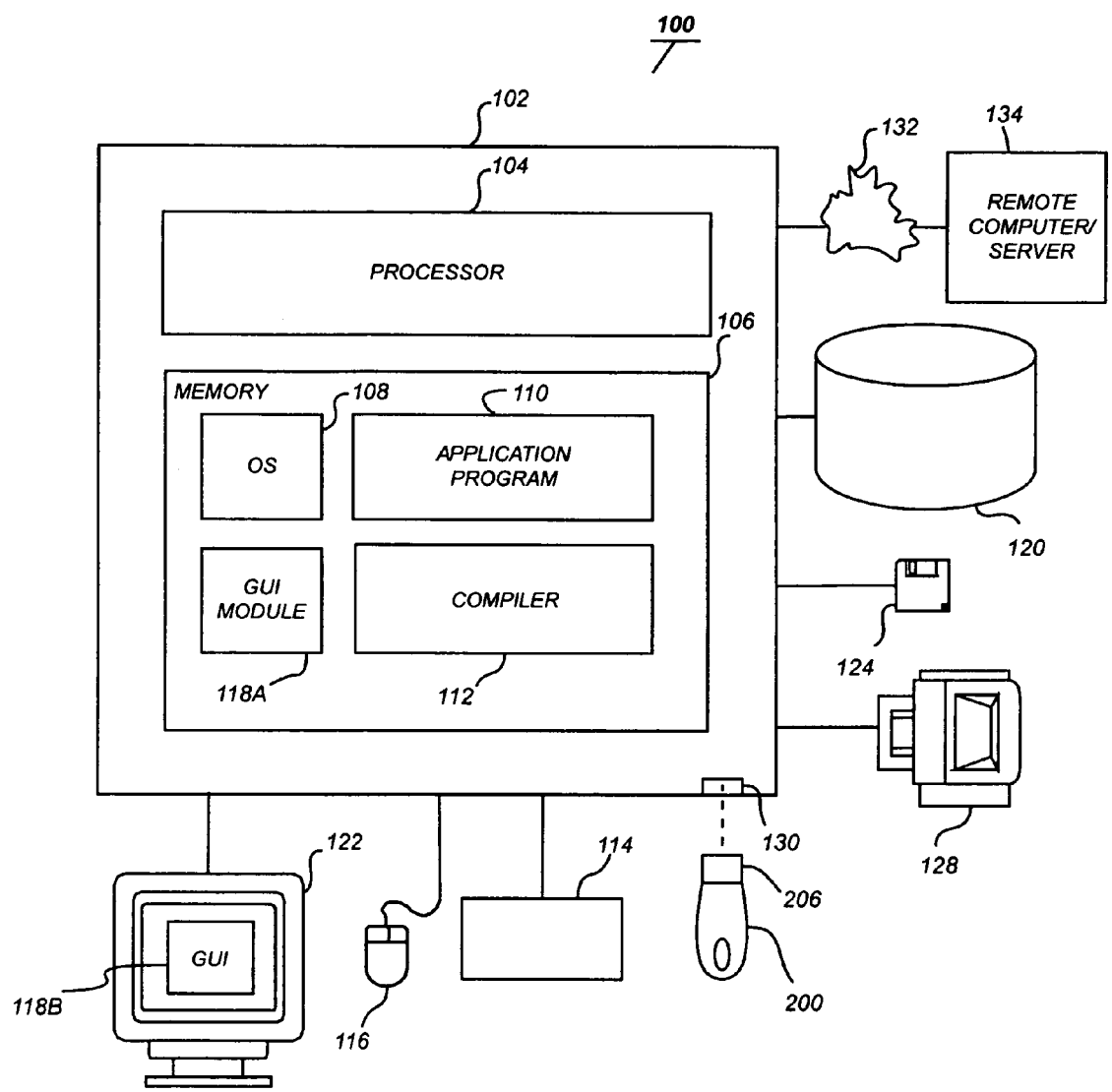
FIG. 1 is a diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that are generated using the compiler 112. The computer 102 also comprises an input/output (I/O) port 130 for a personal token 200 (hereinafter alternatively referred to also as a personal key 200). In one embodiment, the I/O port 130 is a USB-compliant port implementing a USB-compliant interface.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

The computer 102 may be communicatively coupled to a remote computer or server 134 via communication medium 132 such as a dial-up network, a wide area network (WAN), local area network (LAN), virtual private network (VPN) or the Internet. Program instructions for computer operation, including additional or alternative application programs can be loaded from the remote computer/server 134. In one embodiment, the computer 102 implements an Internet browser, allowing the user to access the world wide web (WWW) and other internet resources.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Architectural Overview

Figure 2:
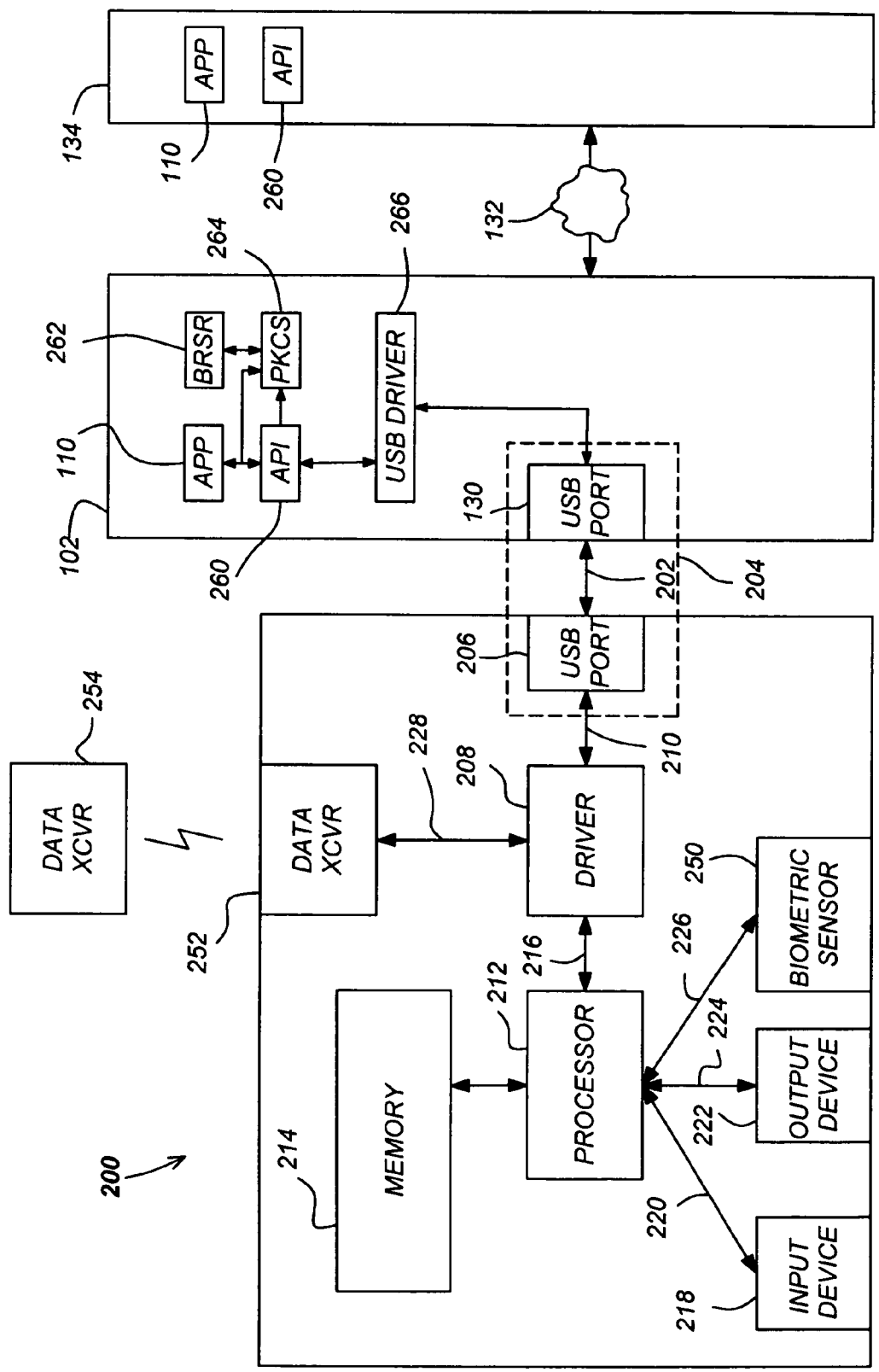
FIG. 2 is a block diagram illustrating selected modules of one embodiment of the present invention.

FIG. 2 is a block diagram illustrating selected modules of the present invention. The personal key 200 communicates with and obtains power from the host computer through a USB-compliant communication path 202 in the USB-compliant interface 204 which includes the input/output port 130 of the host computer 102 and a matching input/output (I/O) port 206 on the personal key 200. Signals received at the personal key I/O port 206 are passed to and from the processor 212 by a driver/buffer 208 via communication paths 210 and 216. The processor 212 is communicatively coupled to a memory 214, which may store data and instructions to implement the above-described features of the invention. In one embodiment, the memory 214 is a non-volatile random-access memory that can retain factory-supplied data as well as customer-supplied application related data. The processor 212 may also include some internal memory for performing some of these functions.

The processor 212 is optionally communicatively coupled to an input device 218 via an input device communication path 220 and to an output device 222 via an output device communication path 224, both of which are distinct from the USB-compliant interface 204 and communication path 202. These separate communication paths 220 and 224 allow the user to view information about processor 212 operations and provide input related to processor 212 operations without allowing a process or other entity with visibility to the USB-compliant interface 204 to eavesdrop or intercede. This permits secure communications between the key processor 212 and the user. In one embodiment of the invention set forth more fully below, the user communicates directly with the processor 212 by physical manipulation of mechanical switches or devices actuatable from the external side of the key (for example, by pressure-sensitive devices such as buttons and mechanical switches). In another embodiment of the invention set forth more fully below, the input device includes a wheel with tactile detents indicating the selection of characters.

The input device and output devices 218, 222 may cooperatively interact with one another to enhance the functionality of the personal key 200. For example, the output device 222 may provide information prompting the user to enter information into the input device 218. For example, the output device 222 may comprise a visual display such as an alphanumeric LED or LCD display (which can display Arabic numbers and or letters) and/or an aural device. The user may be prompted to enter information by a beeping of the aural device, by a flashing pattern of the LED, or by both. The output device 222 may also optionally be used to confirm entry of information by the input device 218. For example, an aural output device may beep when the user enters information into the input device 218 or when the user input is invalid. The input device 218 may take one of many forms, including different combinations of input devices.

Although the input device communication path 220 and the output device communication path 224 are illustrated in FIG. 2 as separate paths, the present invention can be implemented by combining the paths 220 and 224 while still retaining a communication path distinct from the USB-compliant interface 204. For example, the input device 218 and output device 222 may be packaged in a single device and communications with the processor 212 multiplexed over a single communication path.

In one embodiment of the invention, the present invention further comprises a second output device 222 that may be coupled to the USB-compliant interface 204 instead of being coupled to the processor via a communication path distinct from the USB-compliant interface 204. This embodiment may be used, for example, to indicate to the user that the personal key 200 has been correctly inserted into the host computer's USB port (for example, by providing an indication of a power signal of the USB-compliant interface). The second output device may also be used to show that data is passing to and from the host computer and the personal key 200 (for example, by providing an indication of a data signal from the USB-compliant interface).

The host computer has an interface including a USB driver module 266 communicatively coupled to an application program interface (API) 260 having a plurality of API library routines. The API 260 provides an interface with the application 110 to issue commands and accept results from the personal key 200. In one embodiment, a browser 262, such as the browser available from NETSCAPE, Inc. operates with the API 260 and the public key cryptographic standard (PKCS) module 264 to implement a token-based user authentication system.

While the portability and utility of the personal key has many advantages, it also has one important disadvantage . . . it can be lost or stolen. This is especially troublesome because the personal key 200 represents a secure repository for so much of the user's private data. For these reasons, the ultimate security of the information contained in the personal key 200 (but not necessarily the personal key 200 itself) is highly important.

Ultimately, the personal key 200 identifies the possessor to the outside world through the host computer 102, but there is no guarantee that the person in possession of the personal key 200 is the actual owner, because the personal key may have been lost or stolen. Security can be increased with the use of personal passwords and the like, but this solution is not ideal. First, the use of a single password raises the very real possibility that the password may have been compromised (after all, the thief may know the user, and hence, the user's password). Also, requiring the entry of a password multiple times increases the chance that malicious software executing in the host computer 102 or the remote computer 134 may eavesdrop on the password or personal identification. The use of multiple passwords is no solution because one of the reasons for using the personal key 200 is to relieve the user of the need to remember a number of passwords. Another problem with passwords is that hacking methods can be employed to circumvent the password protection or to discover the password itself. This is especially problematic in context of a personal key 200 which in most cases, depends on data entered in a host computer 102 peripheral such as the keyboard 114 and transmitted via the input/output port 130, rendering the personal key 200 vulnerable to hacking.

In one embodiment of the present invention, a biometric sensing device 250 is mounted on or in the personal key 200 to collect biometric data from the user when the user is holding the personal key 200. In one embodiment, the biometric sensing device 250 comprises a fingerprint sensor, which is capable of reading the user's fingerprints. The biometric sensor 250 may also include built-in processing to reduce the biometric data to data suitable for use by the processor 212. If necessary for the collection of biometric data, a light emitting or heat-emitting device can be placed proximate to the biometric sensor to provide an active data measurement using light or heat.

The biometric sensor 250 is nominally placed where it can best measure the biometric data of interest. In the illustrated embodiment, the biometric sensor 250 is sized and disposed to collect data from the user's thumbprint when the user grips the personal key 200 to insert it into the host computer 102 I/0 port 130. To facilitate measurement of the holder's fingerprint, the exterior surface of the personal key 200 can be designed to cradle the user's thumb in a particular place.

Alternatively, to increase security, the exterior appearance of the personal key 200 may be designed to mask the presence of the biometric sensor 250 entirely.

The biometric sensor 250 can be advantageously placed in a position where it can be expected to collect known data of a predictable type, at a known time (for example, obtaining a thumbprint when the personal key 200 is plugged into the host computer I/O port 130). The personal key 200 accepts data from the biometric sensor 250 via biometric sensor communication path 226 to verify the identity of the person holding the key with no passwords to remember or compromise, or any other input. Thus, the biometric sensor 250 provides a personal key 200 with a heightened level of security which is greater than that which can be obtained with a biometric sensor or passwords alone. If necessary, the personal key 200 can be configured to recognize the host computer 102 it is plugged into, and using data thus obtained, further increase the security of the key.

The biometric sensor can also be used to increase the security of the personal key in other ways as well. For example, if the personal key were to be stolen, the biometric sensor can be used to measure the fingerprint of the thief. This data can be stored and retained until such time as the thief attempts to use the personal key to make a purchase, for example on the Internet. At this time, the personal key 200 can be programmed to contact (with or without visibility to the thief) a particular entity (such as an Internet site), where the fingerprint information (and any other relevant information) can be transferred to the appropriate authority. The personal key 200 may also perform this dial up and report function if a number of incorrect passwords have been supplied.

In one embodiment of the present invention, the personal key 200 also comprises a data transceiver 252 for communicating data with an external data transceiver 254. The data transceiver 252 is communicatively coupled to the processor 212, via the driver 208 and communication paths 216 and 228, and allows the personal key 200 to transmit and receive data via the transmission and reception of electromagnetic waves without exposing the data to the USB-compliant interface 204. Alternatively, the data transceiver 252 may be communicatively coupled directly to the processor 212.

In one embodiment, the data transceiver 252 comprises an infrared (IR) transceiver that can communicate with a number of commercially available peripherals with similar capability. This feature provides the personal key 200 another means for communicating with external peripherals and devices, even when the personal key 200 is already coupled to the I/O port 130 of the host computer 102.

In one embodiment, the personal key 200 also comprises a power source such as a battery or capacitive device. The power source supplies power to the components of the personal key to allow the data to be retained and to allow personal key functions and operations to be performed, even when disconnected from the host computer 102.

Figure 3:
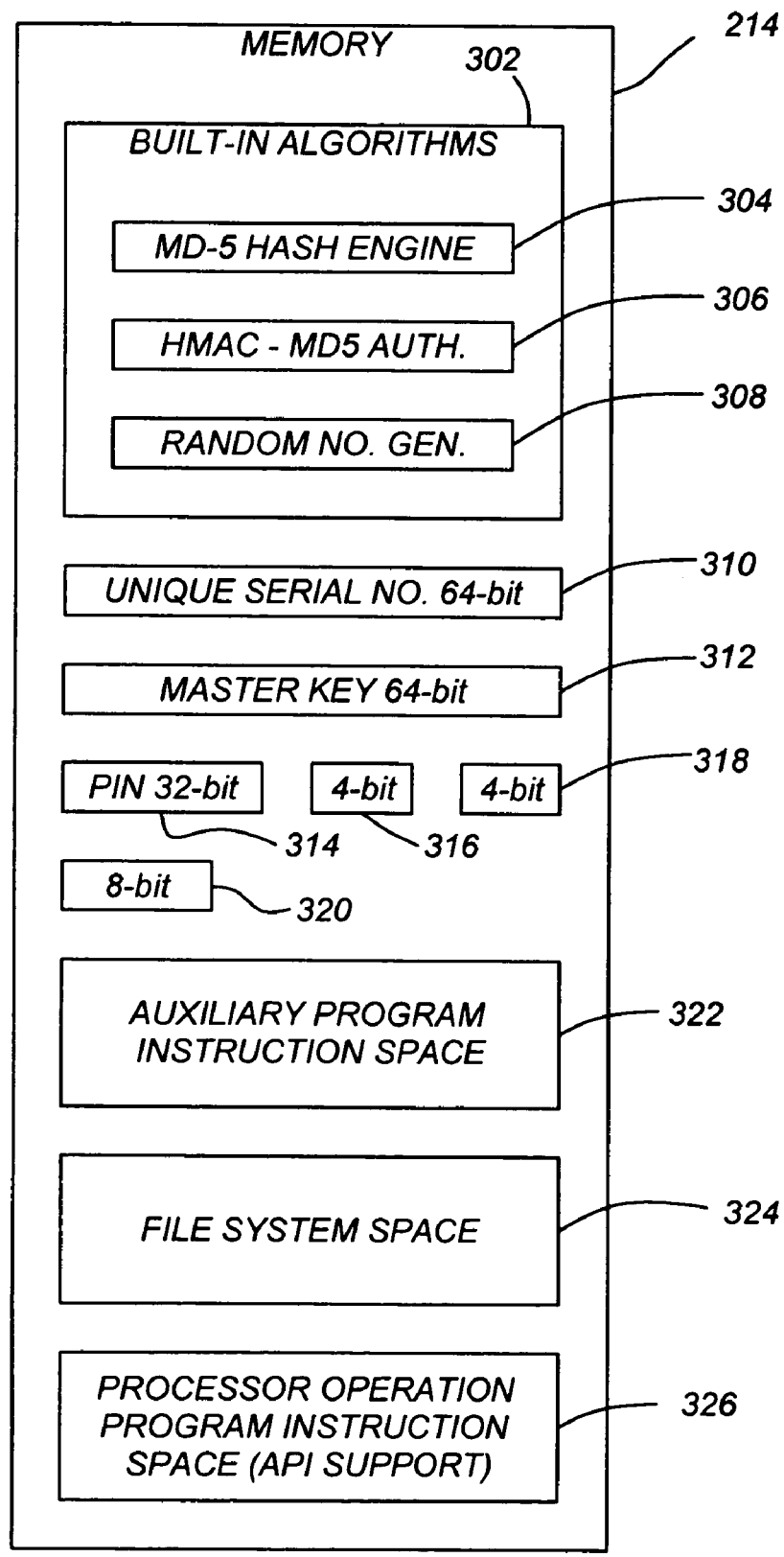
FIG. 3 is a diagram of the memory resources provided by the memory of the personal key.

FIG. 3 is a diagram of the memory resources provided by the memory 214 of the personal key 200. The memory resources include a master key memory resource 312, a personal identification number (PIN) memory resource 314, an associated PIN counter register 316 and PIN reset register resource 318, a serial number memory resource 310, a global access control register memory resource 320, a file system space 324, auxiliary program instruction space 322, and a processor operation program instruction space 326. The processor operation program instruction space 326 stores instructions that the personal key 200 executes to perform the nominal operations described herein, including those supporting functions called by the application program interface 260 associated with the applications 110 executing in either the host computer 102 or the remote server 134. The auxiliary program instruction space provides the personal key 200 with space to store processor 212 instructions for implementing additional functionality, if desired.

The master key is an administrative password that must be known by the trusted entity or program that will initialize and configure the personal key 200. For example, if the personal key 200 is to be supplied to a number of remotely located employees to enable access to private documents stored in a remote server through a VPN, the system administrator for the remote server may enter the master key (or change the key from the factory settings) before providing the key to the remotely located employees. The system administrator also stores the master key in a secure place, and uses this master key to perform the required secure operations (including, for example, authorization and authentication of the remote users).

In one embodiment, the master key can not be configured, reset, or initialized if the MKEY can not be verified first. Hence, if the master key is unknown the personal key 200 would have to be destroyed/thrown away or returned to the factory to be reset to the factory settings.

The PIN is an optional value that can be used to authenticate the user of the personal key 200. The PIN is initialized by the trusted administrator. Depending on how the personal key 200 initialization program is implemented and deployed, it is possible for the end user to set and/or update their PIN. The PIN may comprise alphanumeric characters or simply numbers.

The PIN can also be checked using an application program interface (API) call that transparently uses the two associated registers 316 and 318. The PIN counter resource 316 is a decrementing counter, while the PIN reset register resource 318 is used to store a limit that is used to reset the PIN counter 316 memory resource. The PIN count and limit registers 316 and 318 are used to prevent a rogue application or user from rapidly testing thousands of random PINs in an attempt to discover the PIN.

When the PIN is initialized, the decrementing counter register 316 is set to the value in the PIN reset register resource 318. Whenever a PIN verification fails the counter register 316 is decremented. When a PIN verification succeeds then the counter register is set to the limit value. When the decrementing counter register 316 reaches 0, no more PIN verifications are permitted until a trusted administrator resets the PIN counter register 316 to the limit value. For example if the PIN reset register resource 318 limit has been set to 3, then a user could fail PIN verification 3 times whereupon the PIN would be rendered useless until it is reset. The counter register 316 would be reset to 3 when a correct PIN was successfully verified.

The serial number is a unique factory installed serial number (SN). The serial number can be used to differentiate a single user from all other personal key 200 users.

The memory 214 of the personal key 200 also includes built in algorithm memory resources 302, including a MD-5 hash engine memory 304 for storing related processing instructions, an HMAC-MD5 authorization memory resource 306 for storing related processing instructions, and a random number generator memory resource 308 for storing processing instructions for generating random numbers.

The random number generator can be used to generate challenges to be used when generating authentication digest results as well as to provide seeds to other cryptographic procedures. The MD-5 algorithm accepts as an input a message of arbitrary length, and produces a 128-bit "fingerprint" or "message digest" of the input as an output. In doing so, the algorithm scrambles or hashes the input data into a reproducible product using a high speed algorithm such as RFC-1321. The hashed message authentication codes (HMAC) can be used in combination with any iterated cryptographic hash function (e.g. MD-5) along with a secret key, to authenticate a message or collection of data. The personal key 200 integrates this method to provide a way for the end user or application data to be authenticated without exposing the secret key.

The present invention allows end user authorization using two security mechanisms. The first mechanism, which is discussed below, allows software running on the host computer 102 or the remote computer/server 134 to authenticate the personal key 200. This first mechanism uses a hashing algorithm and a mutually agreed upon secret value known to both the personal key 200 and the entity attempting to authenticate the personal key. The second mechanism, which is discussed later in this disclosure, allows the personal key 200 to authenticate the user who is trying to use the personal key 200. This second mechanism uses a personal identification number (PIN) to help prevent unauthorized use or access in situations where the key has been lost or stolen. As set forth more fully below, the PIN can be entered directly in the personal key 200, thus increasing security by assuring that the PIN is never exposed external to the personal key 200.

Figure 4:
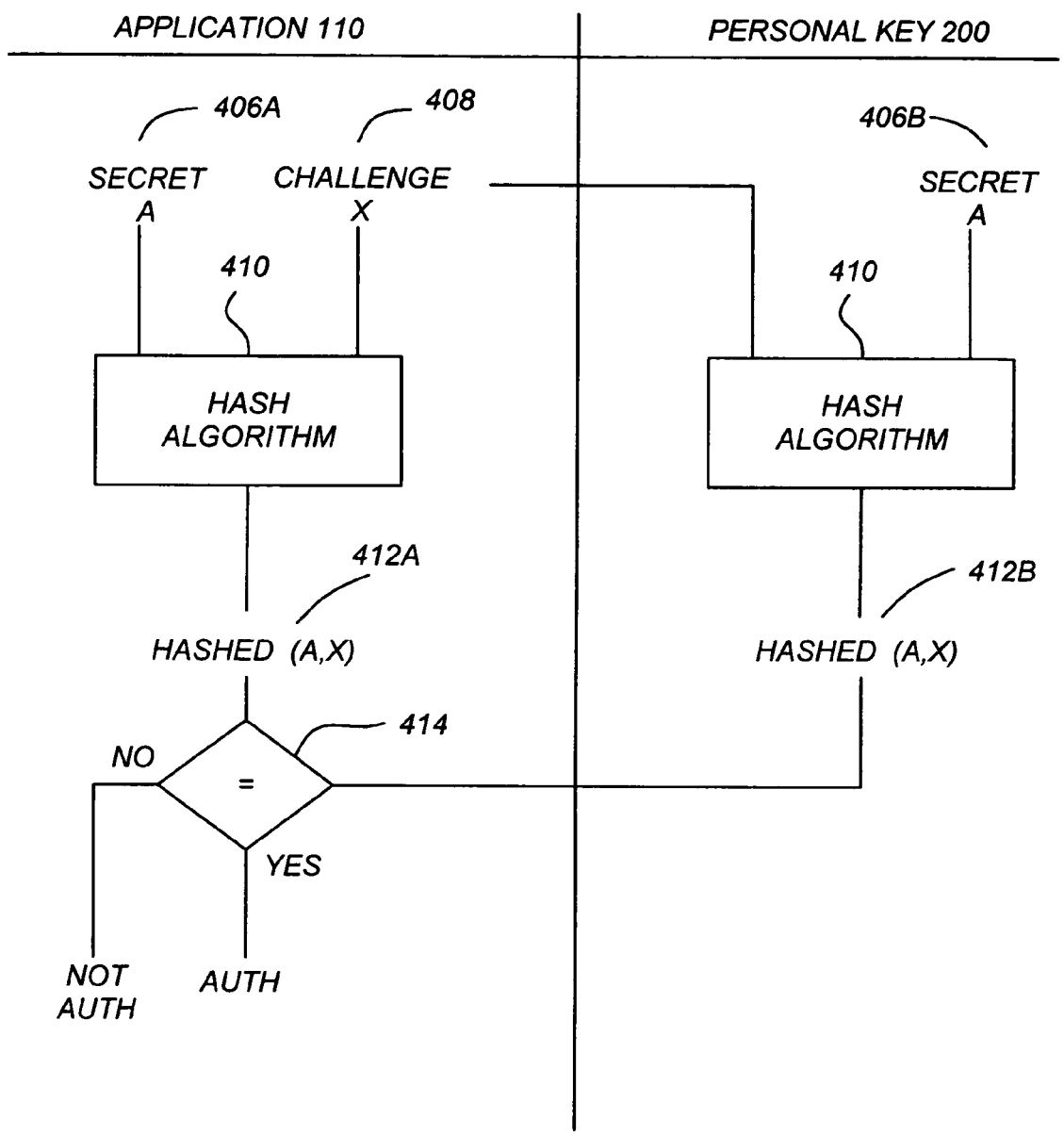
FIG. 4 is a diagram showing one embodiment of how an encryption engine is used to authenticate the identity of the personal key or the application data stored therein.

FIG. 4 is a diagram showing one embodiment of how the HMAC-MD5 engine is used to authenticate the identity of the personal key 200 or the application data stored therein. Associated with the personal key 200 and executing either in the host computer 102 or the remote computer/server 134 is a personal key library of functions which are linked with an application executing in the host computer (e.g. application program 110) or in the remote computer/server 134. A hash algorithm 410 is implemented in both the application 110 and the personal key 200. Both the application 110 and the personal key 200 have access to a secret 406. The secret 406B is retained within the memory 214 of the personal key 200 in a location where it cannot be accessed without suitable permission. Typically, secret 406B is stored in the personal key 200 by the system administrator or some other trusted source. Hence, if the user of the personal key 200 is the entity that the application 110 thinks it is, the application's secret 406A and the personal key's secret 406B are the same. This can be verified by a hashing algorithm without exposing the secret. Similarly, if the user of the personal key 200 is not the entity that the application expects, secrets 406A and 406B will be different. This too can be verified by a hashing algorithm without exposing the secret.

A challenge is generated by the application 110, and provided to the hash algorithms 410 accessible to the application 110 and the hash algorithm implemented in the personal key 200. Each hash algorithm applies the challenge and the resident secret to generate a hashed output 412. If the hash algorithms were equivalent and each of the secrets 406A and 406B were the same, the resulting hashed output 412 or digest string in each case should be the same. If the digest strings 412A and 412B compare equal using logic 414 in the application, the personal key 200 is trusted. Further, if the user authentication was verified, the user is trusted as well. One advantage in this authentication system is that the challenge 408 can be transmitted over untrusted media such as the Internet. The secret 406 remains coded in the application 110 or remote server 134 program and in the personal key 200 where it remains without being exposed to network sniffers/snoopers or potentially compromised user interfaces.

The file system memory resource 324 is fully managed within the application program interface library 260 in either the host computer 102 or the remote server 134. It provides a flexible system for storing, protecting, and retrieving personal key 200 data.

Figure 5:
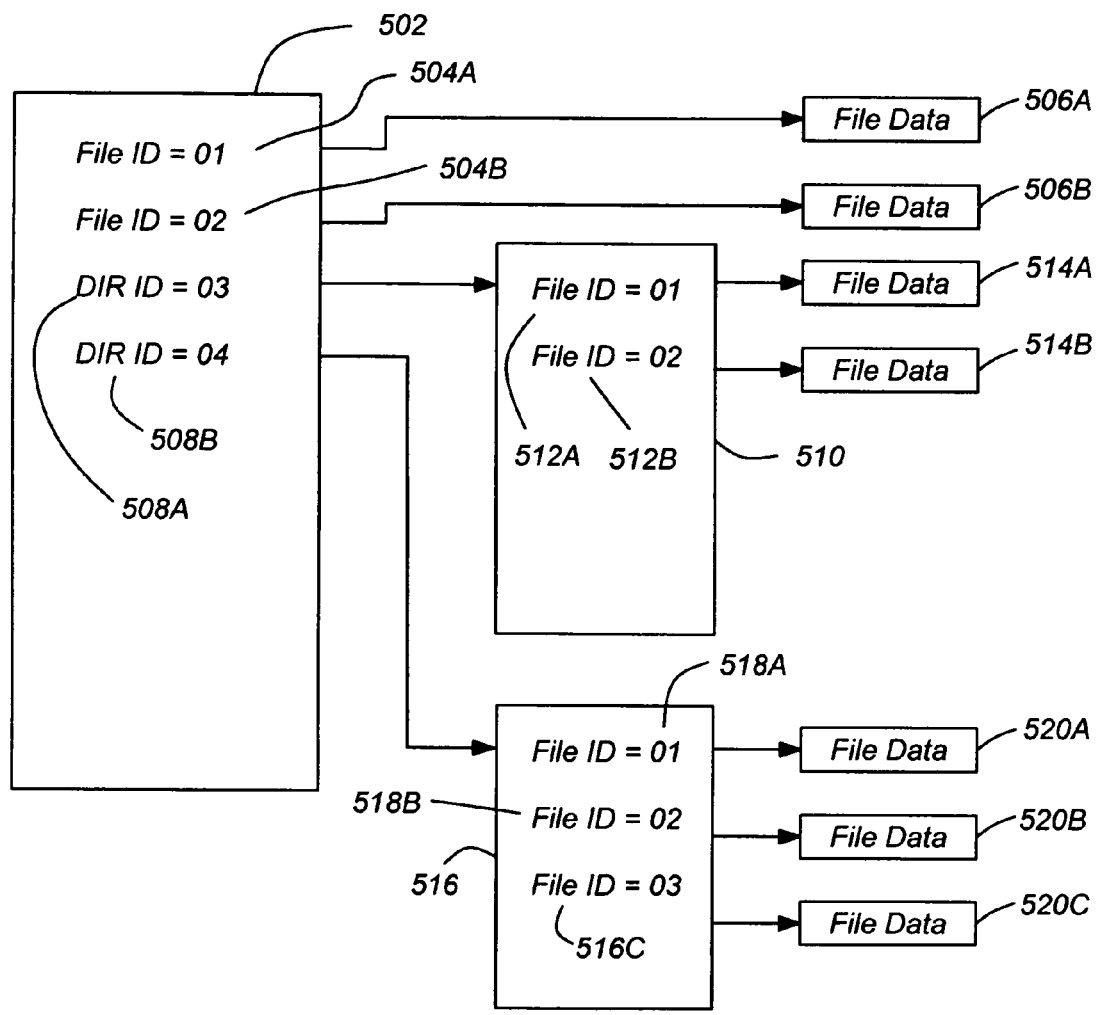
FIG. 5 is a diagram illustrating the data contents of a file system memory resource of an active personal key that provides authentication and specific configuration data for several application.

FIG. 5 is a diagram illustrating the data contents of a file system memory resource 324 of an active personal key 200 that provides authentication and specific configuration data for several applications. The master file (MF) 502 is the root directory and uses an identification (ID) of zero (0). The MF 502 may contain pointers 504A and 504B or other designations to data files 506A and 506B, as well as pointers 508A and 508B to directories 510 and 516. Directories and files are defined by an identification (1→0xFFFFFFFF for the directories, and 0→0xFFFFFFFF for files). The directories 510 and 516 also contain pointers (512A-512B and 518A-518B, respectively) to data files (514A-514B and 520A-520C, respectively).

Three file types are implemented, as shown in Table 1 below:

TABLE 1

| Type | Access |
|---|---|
| DATA | Any variable length string of unsigned characters |
| KEY | Strings that are used as input to cryptographic operations |
| CTR | Data files that have a decrementing counter (e.g. a counter of 16 bits). The counters range from 0 to XFF and are used to limit the number of times a data file can be read. |

These file types can be controlled on a per-file basis, according to Table 2 below:

TABLE 2

| | File Types | | |
|---|---|---|---|
| Access Types | DATA | KEY | CTR |
| Read | Control | Never - no control | Control |
| Write | Control | Control | Control |
| Crypt | Always - no control | Control | Always - no control |

The read and write access type controls govern the transfer of files in the personal key 200 to and from the application 110. The crypt access type is used with KEY file types for performing cryptographic operations including the computation of hash values, encrypting, or decrypting data. When set, the controls defined in Table 2 can have one of four attributes listed in Table 3 below:

TABLE 3

| Attribute | Access |
|---|---|
| ALWAYS | Always granted, regardless of whether the proper PIN or MKEY has been supplied to the personal key 200. |
| NEVER | Never granted, regardless of whether the proper PIN or MKEY has been supplied to the personal key 200. |
| PIN | Access is granted if and only if the proper PIN has been supplied to the personal key 200, and PIN verification is successful (user authentication). |
| MKEY | Access is granted if and only if the proper master key (MKEY) has been provided to the personal key 200, and master key verification is successful (super user or security officer authentication). |

A global access control register 320 applies to the entire scope of the personal key 200 file system. Nominally, the global access control register 320 is an 8-bit value that is divided into two global access controls as shown in Table 4 below:

TABLE 4

| Global Access Type | Global File System Access |
|---|---|
| Create | Control |
| Delete | Control |

The create and delete global access types can have one of the four attribute values shown in Table 5 below. The create and delete global controls are enforced by the CreateDir, CreateFile, DeleteDir, DeleteFile, and DeleteAllFiles API calls described in Table 5 below.

TABLE 5

| Attribute | Access |
|---|---|
| ALWAYS | Always granted, regardless of whether the proper PIN or MKEY has been supplied to the personal key 200. |
| NEVER | Never granted, regardless of whether the proper PIN or MKEY has been supplied to the personal key 200. |
| PIN | Access is granted if and only if the proper PIN has been supplied to the personal key 200, and PIN verification is successful (user authentication). |
| MKEY | Access is granted if and only if the proper MKEY has been supplied to the personal key 200, and PIN verification is successful (super user or security officer authentication). |

Table 6 is an alphabetical listing of personal key 200 APIs 260 in the library. In Table 6, "D" indicates a device-related function, "F" denotes a file system related function, "A" denotes an administrative function, and "C" denotes a cryptographic function.

TABLE 6

| Name | Description | D | F | A | C |
|---|---|---|---|---|---|
| CloseDevice | Close access to the personal key | ✓ | | | |
| CloseFile | Close selected file | | ✓ | | |
| CreateDir | Create a directory in the personal key memory | | ✓ | ✓ | |
| CreateFile | Create a file in the personal key memory | | ✓ | ✓ | |
| Decrement | Decrement a CTR type file | | ✓ | | |
| DeleteAllFiles | Reformat file space | | ✓ | ✓ | |
| DeleteDir | Delete directory | | ✓ | ✓ | |
| DeleteFile | Delete file | | ✓ | ✓ | |
| Dir | Return directory and file information | | ✓ | | |
| GetAccessSettings | Return current global create/delete | | | ✓ | |
| GetChallenge | Returns a 64-bit random number | | | ✓ | ✓ |
| GetSerialNumber | Read unique serial number | ✓ | | ✓ | |
| HashToken | MD5 hash the selected file or current open file - two modes are supported (1) XOR hash and HMAC hash | | ✓ | | ✓ |
| HMAC_MD5 | This function is a wrapper for performing HMAC-MD5 using the HashToken function in the HMAC mode. It computes MD5 without exposing the key. | | ✓ | | ✓ |
| LedControl | Control the output device, including turning an LED or other output device on or off | ✓ | | | |
| ModifyMasterKey | Update/Modify master key | | | ✓ | |
| ModifyPIN | Update/Modify PIN | | | ✓ | |
| OpenDevice | Open one of 32 potential personal keys | ✓ | | | |

TABLE 6-continued

| Name | Description | D | F | A | C |
|---|---|---|---|---|---|
| ReadFile | Returns contents of selected file | | ✓ | | |
| ResetDevice | Reset to power-on state | ✓ | | ✓ | |
| SelectFile | Open a file | | ✓ | | |
| SetAccessSettings | Update global create/delete access settings | | | ✓ | |
| VerifyMasterKey | Verify the master key provided as an argument is the master key stored in the personal key | | | ✓ | |
| VerifyPIN | Verify that the PIN provided as an argument is the PIN stored in the personal key (user authentication) | | | ✓ | |
| VerifyPIN2 | An alternative command used to verify the user PIN without exposing the PIN externally to the personal key 200. This command is issued without the PIN as an argument, and the personal key 200 returns a response indicating whether the PIN entered by the user on the input device 218 matches that of the stored PIN in the memory 214. | | | | ✓ |
| WriteFile | Write contents to the selected file | | ✓ | | |
| MD5_Hash | Hash routine: wrapper (provided in API library and not implemented in personal key) | | | | ✓ |
| MD5Final | Finish computation and return digest (provided in API library and not implemented in personal key) | | | | ✓ |
| MD5Init | Initialize message digest context (provided in API library and not implemented in personal key) | | | | ✓ |
| MD5Update | Update message digest context (provided in API library and not implemented in personal key) | | | | ✓ |

EXEMPLARY APPLICATION TO A VIRTUAL PRIVATE NETWORK

Using the foregoing, the personal key 200 and related APIs 260 can be used to implement a secure document access system. This secure document access system provides remote users access to secret encrypted documents over the Internet to company employees. The system also limits the circulation of secret encrypted documents so that specified documents can be read only a limited number of times.

The application program 110 used for reading documents is linked with the personal key API 260 library to allow document viewing based on the information in the personal key 200. A trusted administrative program controlled by the master key can be used to set up the personal key 200 (by storing the appropriate information with the associated security control settings) for a wide range of employees.

The personal key 200 and the API 260 library can be used to authenticate document viewers and administrators, to supply keys for decryption and encryption of documents, to provide a list of viewable documents, and to enforce document access rights and counters.

The foregoing can be implemented in a number of programs, including an administrative initialization program to set up the personal keys 200 before delivery to the employees (hereinafter referred to as SETKEY), a document encryption and library update program (hereinafter referred to as BUILDDOC), a viewer application that authenticates the user and the personal key 200 (hereinafter referred to as VIEWDOC), and a library application which authenticates the user and updates the personal key (hereinafter referred to as LIBDOC).

The SETKEY program is used to setup personal keys received from the factory for individual users. Document names, access counters, a PIN, and a hash secret are loaded into the personal key 200. Depending on the employee's security clearance, specific documents can be configured for viewing. For sake of clarification the following symbolic names are used in the discussion below:

DOCFilename—iKey data file that holds the document file name

DOCSecret—iKey data file that holds a secret used to make encryption/decryption keys First, the SETKEY program gains access to the personal key 200 by issuing an OpenDevice command. The VerifyMasterKey command is then issued to open the personal key 200 to master access. A Dir command is used in a loop to obtain and verify the status of the personal key 200. The comments are compared to the contents of a factory-fresh key, and one of several states is determined. If the key is factory fresh, the personal key is initialized. A VIEWDOC directory and file set is then created. An employee database can then be accessed and used to determine the type and extent of the access that is to be granted to each employee. Depending on the security clearance of each employee, one of several types of directory and file sets can be created. The global create and delete access types are then set to the master key using the SetAccessSettings command. The DOCFilename database is then loaded in the personal key 200, and the CreateDir and CreateFile APIs 260 are used as required to create and allocate directories and files. The SelectFile, WriteFile, and CloseFile API commands are used to load the files and the secret. Depending on whether access is to be limited to a particular number of occasions, the DATA or CTR file types are used.

The BUILDOC program is used to accept new documents into the secure access library. Using information from the personal key 200, encryption keys are generated that are used by a document encryption engine in the personal key 200.

The BUILDOC program is a stand-alone application that runs on trusted systems within the secure walls of the organization. It requires validation of the master key. It uses the personal key 200 to create an encryption key for each document file name.

First, the HashToken API 260 with the XOR option is used to hash together the DOCFilename, block number (computed by the BUILDOC program as it reads and encrypts the document), DOCSecret. The block number is calculated by the BUILDOC program as it reads and encrypts the document. The resulting MD5-XOR digest is used as the encryption key that is used by the encryption engine in the BUILDOC application. Then, the CreateFile, SelectFile, WriteFile, and CloseFile APIs 260 along with the HashToken in XOR mode are used on each document that is to be added to the secure document library.

The VIEWDOC program is a web browser 262 plug-in application allows the user to open, decrypt, an view the document based on his/her personal key 200 based document access codes. If desired, the view counters for some types of documents can also be decremented in the VIEWDOC program. The VIEWDOC program does not require file saving or forwarding, screen scraping, and printing.

The VIEWDOC program validates the user and uploads and decrypts the documents. It uses the VerifyPIN command API 260 to authenticate the user. The user can then view the documents listed in the personal key 200 directory as long as the personal key 200 remains communicatively coupled to the USB port 130.

A message facility, such as the message facility used in the WINDOWS operating system (WM_DEVICECHANGE) can be used to determine if the key has been removed. The Dir, SelectFile, ReadFile, and CloseFile command APIs 260 are used to determine which documents can be read. The HashToken with the XOR mode API 260 along with DOCSecret, DOCFilename, and the document block numbers are used to create the decryption key on a per block basis. When the DOCfilename is of file type CTR, the CTR is decremented using the Decrement command API 260. In one embodiment, to reduce complexity, the CTR field is not hashed, but merely managed by VIEWDOC.

The LIBDOC program provides an administrative function that is a subset of SETKEY. It allows a secure document librarian to grant access to documents based upon information stored in the personal key 200. The net effect is that the trusted librarian can update the personal key 200 based list of documents that can be viewed.

The LIBDOC program updates the list of DOCFilenames on a per-personal key 200 basis. After verifying the master key with VerifyMasterKey command API 260 and looking the user name up in the employee data base, the current set of DOCFilenames are updated using the SelectFile, WriteFile, and CloseFile command APIs 260.

Using the foregoing, employees worldwide can carry a personal key 200 loaded with their local database of file names. Individual departments do not have to rely on MIS procedures to restrict who has access to documents. The personal keys 200 of department members can be updated using the LIBDOC program as required. Documents can be decrypted and viewed by the employees only if the personal key 200 secret is correct. The personal secret remains secure because it is never revealed outside of the personal key 200. A simple form of metering can also be used to reduce the number of copies of documents that can be used to reduce the number of copies of documents that can be viewed.

Figure 6:
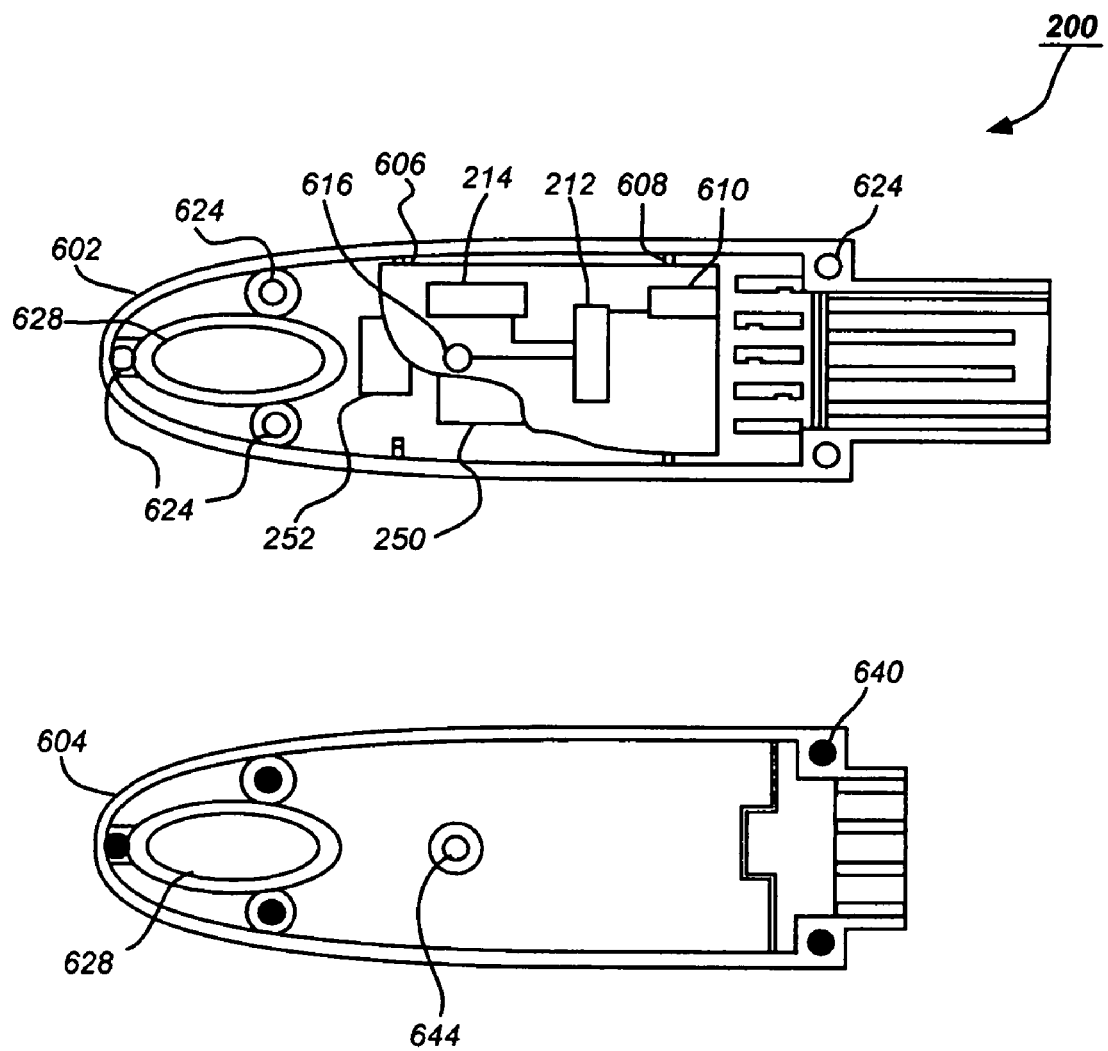
FIG. 6 is a diagram presenting an illustration of one embodiment of the personal key.

FIG. 6 is a diagram presenting an illustration of one embodiment of the personal key 200. The personal key 200 comprises a first housing member 602 and a second housing member 604. The first housing member 602 is sized and shaped so as to accept a circuit board 606 therein.

The first housing member 602 comprises a plurality of bosses 624, which, when inserted into each respective hole 640 in the second housing member 604, secures the first housing member 602 to the second housing member 604. The first housing member 602 and the second housing member 604 also each comprise an aperture 628, which allows the personal key 200 to be affixed to a key chain.

The circuit board 606 is held in position by a plurality of circuit board supports 608. The circuit board 606 comprises a substantially flat circuit connection surface 610 on the periphery of the circuit board 606 for communicative coupling with the host processing device or computer 102 via conductive pins. Circuit connection surface 610 allows communication with a processor 212 mounted on the circuit board 606. The processor 212 comprises memory and instructions for performing the operations required to implement the functionality of the personal key 200 as disclosed herein. The processor is communicatively coupled with a memory 214 on the circuit board to store and retrieve data as required by processor 212 instructions. In the illustrated embodiment, the circuit board 606 also comprises an output device 222 such as a light emitting device 616, e.g. light emitting diode (LED), which provides the user of the personal key 200 a visual indication of the operations being performed by the personal key 200. This is accomplished, for example, by emitting light according to a signal passing from the host computer 102 to the personal key 200. The light emitting device could also comprise a liquid crystal display (LCD) or other device providing a visual indication of the functions being performed in the personal key or data passing to or from the personal key 200.

The energy from the light emitting device 616 is presented to the user in one of two ways. In the embodiment illustrated in FIG. 2, the light emitting device 616 is disposed through a light emitting device orifice 644 in the second housing member 604. In this design, the personal key 200 can be sealed with the addition of a small amount of epoxy or other suitable material placed in the light emitting device orifice 644 after assembly.

In another embodiment, the light emitting device 616 does not extend beyond the interior of the housing 602, 604, and remains internal to the personal key 200. In this embodiment, at least a portion of the first housing 602 or the second housing 604 is at least partially translucent to the energy being emitted by the light emitting device 616 at the bandwidths of interest. For example, if the light emitting device 616 were a simple LED, the second housing 604 can be selected of a material that is translucent at visual wavelengths. One advantage of the foregoing embodiment is that the LED can be placed where it does not allow electromagnetic discharges and other undesirable energy to the circuit board 606 or any of the components disposed thereon. This is because no part of the LED, even the surface, is in contact with the user's hand at any time.

While the foregoing has been described with a single light emitting device 616, the present invention can also advantageously embody two or more light emitting devices, or devices emitting energy in other wavelengths. For example, the foregoing can be implemented with a three color LED (red, yellow and green), or three one-color LEDs to transfer personal key 200 information to the user.

In addition to or as an alternative to the foregoing, information regarding the operation of the personal key 200 is provided by an aural transducer such as a miniaturized loudspeaker or piezoelectric transducer. Such aural information would be particularly beneficial to users with limited or no vision. For example, the aural transducer can be used to indicate that the personal key 200 has been inserted properly into the host computer 102 I/0 port 130.

An aural transducer may also be used to provide alert information to the user. This is particularly useful in situations where the user is not expecting any input or information from the key. For example, if the personal key 200 or related device is engaged in lengthy computations, the aural transducer can indicate when the process is complete. Also, the aural transducer can indicate when there has been an internal fault, when there has been an attempt to compromise the security of the key with infected or otherwise harmful software instructions, or to prompt the user to take an action such as providing an input to the key 200.

Further, it is envisioned that as the use of personal keys 200 will become widespread, it will be beneficial to incorporate the functions of other devices within the personal key. For example, a device such as a paging transceiver can be incorporated into the personal key to allow the user to be summoned or contacted remotely. Or, the personal key 200 may be used to store programs and instructions such as the user's calendar. In this application, the personal key 200 can be used to remind the user of events on the calendar, especially in conjunction with the LCD display discussed above. The aural transducer can be operated at a wide variety of frequencies, including minimally audible vibrational frequencies. This design is particularly beneficial, since the personal key is small enough to be placed on the user's key ring, where it will be in pocket or purse for lengthy periods of time where it cannot be seen or easily heard.

Figure 7A:
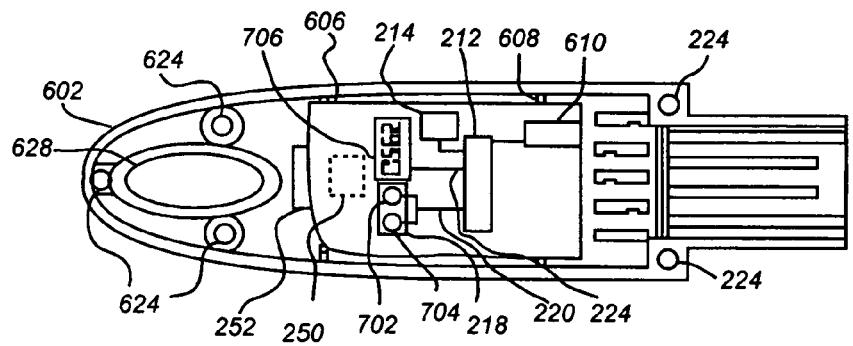
FIGS. 7A-7C are diagrams showing one embodiment of the personal key having an input device including a first pressure sensitive device and a second pressure sensitive device, each communicatively coupled the processor by a communication path distinct from the USB-compliant interface.
Figure 7B:
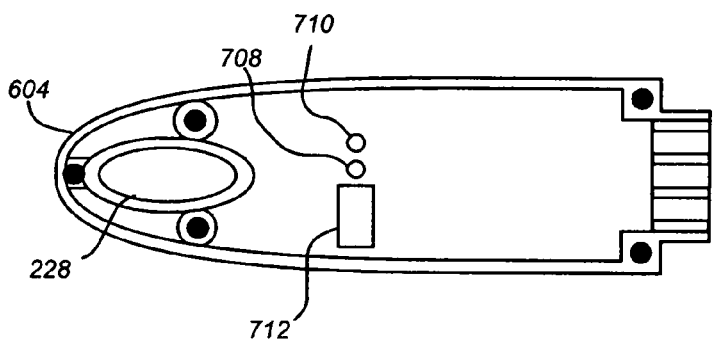
Figure 7C:
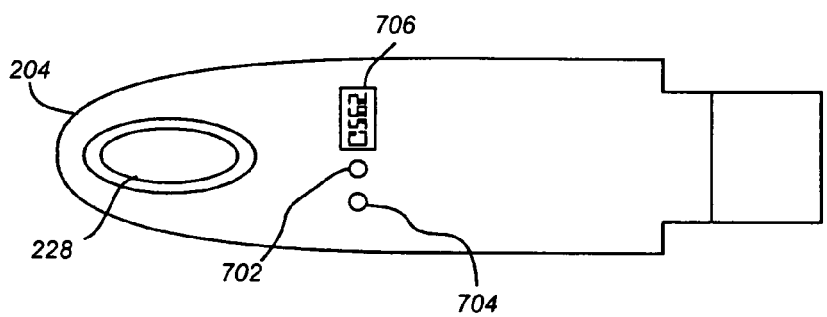

FIGS. 7A-7C are diagrams showing one embodiment of the personal key 200 having an input device 218 including a first pressure sensitive device 702 and a second pressure sensitive device 704, each communicatively coupled the processor 212 by a communication path distinct from the USB-compliant interface 204.

FIG. 7A illustrates an embodiment of the personal key 200 in which an output device 222 such as an LED or LCD display 706 is communicatively coupled to the processor 212 by a second communication path distinct from the USB-compliant interface 204. In this embodiment, input to the personal key processor 212 may be supplied by depressing a combination of the pressure sensitive devices 702, 704, optionally as directed by the output device 222.

In an embodiment illustrated in FIGS. 7B and 7C, the pressure sensitive devices 702 and 704 are simple mechanical push switches communicatively coupled to the processor 212 via traces on the circuit board 606. In this case, the switches 702 and 704 may be actuated by depressing a button surface that extends through apertures 708 and 710 in the second housing member 604. FIG. 7B also shows a window 712 permitting viewing of the output device 706 display.

FIG. 7C shows the exterior appearance of this embodiment of the personal key 200 when the first housing member 602 and the second housing member 604 are assembled.

In another embodiment of the present invention, the pressure switches 702 and 704 do not extend to the exterior of the personal key 200. Instead, the personal key 200 is configured so that pressure may be exerted on the pressure sensitive switches 702 and 704 without requiring any portion of the switches to extend to the exterior of the personal key 200. For example, in one embodiment, at least a portion of the exterior surface of the personal key 200 is sufficiently flexible to permit pressure exerted on the outside surface of the key 200 to actuate the switches therein. Alternatively, the first housing member 602 and the second housing member 604 may be hinged to allow pressure to be applied to the switch. In another embodiment, the thresholded output of a pressure sensitive device such as a strain gauge is used to indicate user input to the personal key.

The foregoing pressure sensitive devices 702 and 704 may be used as follows. In one embodiment, the two pressure sensitive devices 702 and 704 is used to enter alphanumeric information. Here, pressure can be applied to the first pressure sensitive device 702 to select the desired character. To assist the user, the currently selected character can be displayed on the output device 222. When the user is satisfied with the selected character, applying pressure to the second pressure sensitive device may indicate that the currently displayed character should be entered (thus providing an "enter" function). This process may be repeated until all of the characters of the user input (e.g. a user password or personal identification number (PIN) has been entered. The end of the user input can be signified by repeated application of pressure to the second pressure sensitive device 702, and confirmed by the output device 222. An aural transducer can be used alone or in combination with a visual display to indicate the character, to indicate an error, or to indicate when the user input process has been completed.

The foregoing pressure sensitive devices may also be used to provide a binary input to the personal key 200. For example, the user's PIN or password can be entered by applying pressure to the first pressure sensitive device 702 and the second pressure sensitive device 704 in the proper order in rapid succession. In this way, a user password or PIN defined as "10100010111" may be entered by depressing the first pressure sensitive device 702 to indicate a "0" and the second pressure sensitive device 704 to indicate a "1."

Figure 8A:
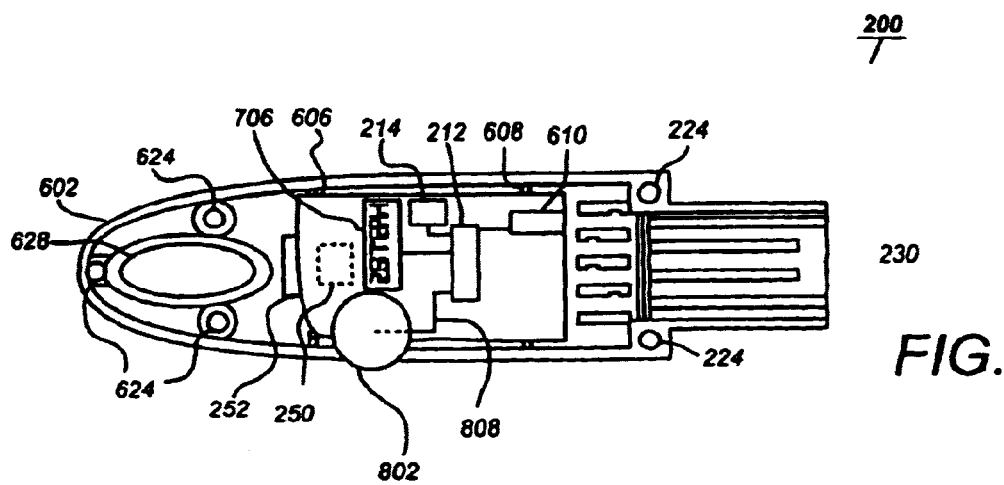
FIGS. 8A-8C are diagrams presenting an illustration of another embodiment of the present invention.
Figure 8B:
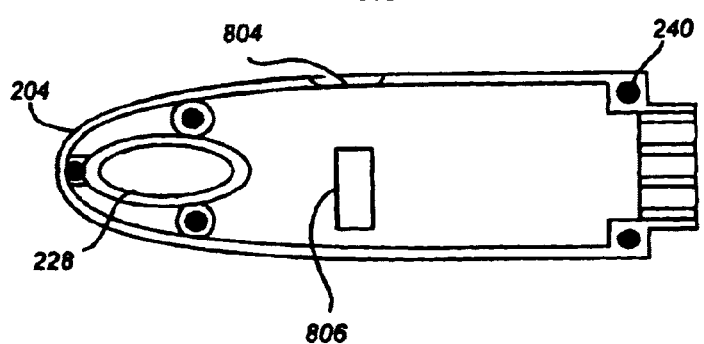
Figure 8C:
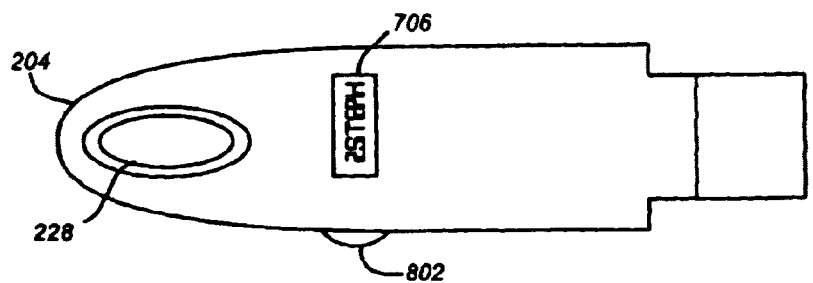

FIGS. 8A-8C are diagrams presenting an illustration of another embodiment of the present invention. In this embodiment, the input device 218 comprises an edge exposed wheel 802 coupled to the processor by the input device communication path 808. In this embodiment, the user provides an input by urging the wheel 802 through a series of tactile positions identifying input characters. When the desired input character is either shown on the output device 222 or on the wheel 802 itself, the user can indicate the character as a user input by urging the wheel 802 toward the centerline of the personal key 200. This process can be repeated for a series of input characters, until all of the desired characters are provided. The user can also indicate that no more input will be provided by urging the wheel 802 toward the center of the personal key multiple times in rapid succession, or by selecting an input tactile position on the wheel 802 and depressing the wheel 802.

SECURITY FEATURES USING THE INPUT AND OUTPUT DEVICES

The input device 218 and output device 222 of the present invention can be advantageously used to enhance the security of the personal key 200. For example, when connected to the host computer 102, the personal key 200 can be used to authorize transactions with a remote computer/server 134 communicatively coupled to the host computer 102 via a communication medium 132 such as a dial-up network, the Internet, LAN, or WAN. Malicious software, which can be executing in the remote computer/server 134 or the host computer 102, can send anything it wants to the personal key 200 for authorization without the knowledge or permission of the user. Without some sort of user input device 218, the personal key 200 can authorize transactions without the user's knowledge that the holder cannot repudiate. Such transactions may include, for example, payment and legally binding signatures.

Although a personal identification such as the personal identification number (PIN) is required to log on and activate the personal key 200, the personal key 200 ordinarily remains active once the PIN has been entered. Hence, the personal key 200 will perform any action for any application, without notice to, or authorization by the user.

To ameliorate this problem, one embodiment of the present invention utilizes a "squeeze to sign" authorization technique, in which some direct user action is required to authorize the use of identified secret values stored in the personal key 200. For instance, if a private key (such as the secret 406) or PIN stored in the memory 214 of the personal key 200 is identified as requiring a "squeeze to sign" authorization, firmware executing in the processor 212 of the personal key 200 requires direct user input via the input device 218 or the data transceiver 252 before honoring any request from the host computer 102 or the remote computer/server 134 that involves the use of the private key or personal information. Ordinarily, the private key and/or other personal information is designated as requiring direct authorization by an associated value or flag in the memory 214. Such data may also be designated as "use-only" indicting that the data cannot be read directly from the key under any circumstances. The data may be shared with no other entity (as would often be the case with a PIN), or may be a value shared with the trusted entity and used for authorization, such as the secret 406. For example, private keys can be used as the secret 406 to perform authorization via hash functions. In such cases, the secret value 406 is typically a shared secret such as a DES key or a password. Since secret values 406 can be stored in the memory 214 of the personal key 200, before distributing the personal key to the user, the secret value 406 need not be made available in plaintext form at any time.

Typically, each time a user connects to an SSL secured web site that supports client authentication, a browser 262 calls middleware such as one of the APIs 260 or the PKCS 264, which commands the personal key 200 to encrypt a challenge value with the user's secret private key 406B (stored in the personal key memory 214). Assuming the user's PIN is already stored in the personal key 200, thus authenticating the user to the personal key 200, it still remains to authenticate the key to the secure web site. In this case, access to the user's secret private key is required, and the output device 222 integrated with the personal key 200 may activate to indicate that a command that requires access to the private key has been invoked, and that the user needs to authorize this access. In one embodiment of the present invention this is accomplished by blinking a visual output device (such as an LED or LCD display), or by beeping an aural device. In another embodiment of the present invention, the middleware (either the API 260 or the PKCS 264) activates the display 122 attached to the computer 102, indicating that the user must authorize access to the private key before processing can proceed. An input device 218 in the personal key 200 such as the wheel 802 or one of the pressure sensitive devices 702 and 704 can then be actuated by the user to indicate that the user has authorized access to the private key. No authorization is granted if the personal key 200 is removed from the I/O port 130, or a "cancel" button presented on the display 122 is selected to refuse the on-screen dialogue. Access to the private key (in the example above, to perform the hash function) is granted if the user authorizes as such. The "squeeze to sign" concept thus makes it less likely that malicious software will be able to use the secret 406B without the user's consent or knowledge.

Malicious software may monitor the interface between the personal key 200 and the host computer 102 to capture the value of user's PIN. Although the PIN cannot be read directly, it is possible for the malicious software to examine both the VerifyPIN command described in Table 6 (and it's argument) and the response from the personal key 200. If the response indicates that the proper PIN was provided as an argument to the VerifyPIN command, the malicious software can determine the PIN itself. The foregoing can also be applied to further safeguard the user's PIN instead of the secret 406B. For example, if a sniffer module in malicious software in the host computer has been able to access the user's PIN, when it attempted to use that PIN in a context the user did not expect, the user would be alerted to the fact that the PIN had been compromised.

Figure 9:
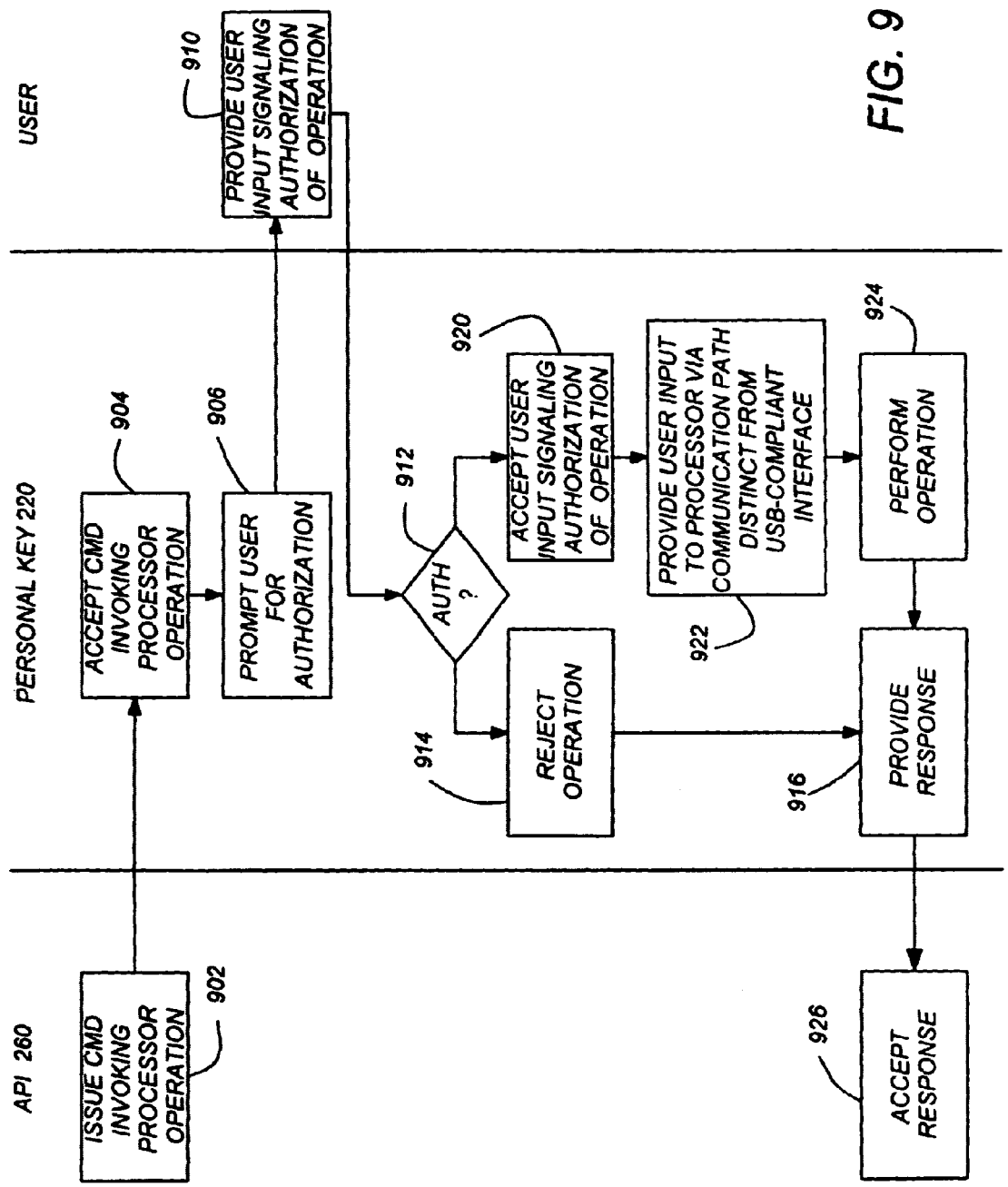
FIG. 9 is a flow chart illustrating an embodiment of the present invention in which processor operations are subject to user authorization.

FIG. 9 is a flow chart illustrating an embodiment of the present invention in which processor 212 operations are subject to user authorization. First, the API 260 issues 902 a command that invokes a processor 212 operation. The command is transmitted via the USB-interface 204 to the personal key 200. The processor 212 accepts the command, as shown in block 904. The personal key 200 then determines whether the invoked processor command is one that requires authorization. This can be accomplished by storing information in the memory 214 of the personal key indicating which processor commands require authorization. For example, this can be implemented in a map stored in the memory 214, a plurality of flags, where it may be customized for each user, or the information can be stored in the processor 212 firmware or similar location so that the mapping cannot be altered. In one embodiment, different levels of authorization are implemented for different processor commands (e.g. a write command may require authorization, whereas a read command may not).

In another embodiment, authorization may be premised on data instead of the invoked command, or on a combination of the invoked command and data. For example, the present invention may be configured to require authorization any time the PIN is accessed in any way, or when the PIN is read from the memory 214 of the personal key 200, but not when other data is read, or when the PIN is written to the personal key 200. This may be accomplished, for example, by determining which data stored in the memory 214 is affected by the processor operation, and determining whether the data affected by the processor operation is associated with an identification designating the data as private information.

Using one of the output devices 222, the data transceiver 252, or the display 122 coupled to the host computer, the personal key 200 may then prompt the user to authorize the processor operation, as shown in block 906. This may be accomplished by flashing a display device such as an LED or LCD, by activating an aural transducer, or by performing both operations. If desired, the user may be prompted first with a display device, and if the authorization is not forthcoming within a specified period of time, the aural transducer may be activated.

To expose the prompting operation as little as possible to malicious software or other intrusive activity, the prompt is preferably performed using a communication path entirely distinct from the communication path between the personal key 200 and the host computer 102 (in the illustrated example) the USB-interface 204. To further increase security, the illustrated embodiment prompts the user with the output device 222 via a communication path which not manifested externally from the personal key in any way that is visible to the malicious software, and is hence not subject to tampering.

Next, the user provides an input signaling authorization of the operation 910. This can be performed using a variety of input devices, such as the mouse 116, or keyboard 114, but is preferably performed using an input device 218 or the data transceiver 252 in the personal key 200. This information is communicated to the personal key 200 via a communication path that is entirely distinct from the communication path between the personal key 200 and the host computer 102, and preferably entirely internal to the personal key 200 (not manifested externally to the personal key 200 by a means visible to malicious software). This prevents malicious software interfering with or emulating the user authorization.

Another embodiment of the present invention provides additional PIN security. In this embodiment, the VerifyPIN command is altered from that which is described in Table 6. Ordinarily, the VerifyPIN command accepts what the host computer 102 or remote computer/server 134 believes is the user's PIN as an argument. The personal key 200 accepts this command and returns a status indicating whether the proper PIN was provided. In this alternative embodiment however, the VerifyPIN command is altered so that it does not include the PIN as an argument. The VerifyPIN command is provided to the personal key 200, and the user is prompted to enter his or her PIN. After the PIN is entered, it is communicated to the processor 212 via a communication path 220 which is distinct from the host computer 102—personal key 200 interface, and not externally manifested anywhere where it can be detected by malicious software. It is then internally verified, and a message providing the result of that manifestation is transmitted from the personal key 200 to the host computer 200 or remote computer/server 134. This prevents any external manifestation of the PIN.

When combined with the hashing technique using the secret 406 above, the foregoing provides a highly secure technique for user authorization. The secure hashing technique authenticates the key, and protects the secret 406 from external exposure. However, the hashing technique does not authenticate the person possessing the key (since it may have been lost or stolen). The ability to enter the PIN directly into the processor 212 of the personal key allows the personal key to authenticate the user, and since the PIN is never manifested externally from the key, exposure to malicious software is prevented. Since the third party can authenticate the personal key and the personal key can authenticate the user, the third party can perform user authentication with a high degree of confidence.

Figure 10:
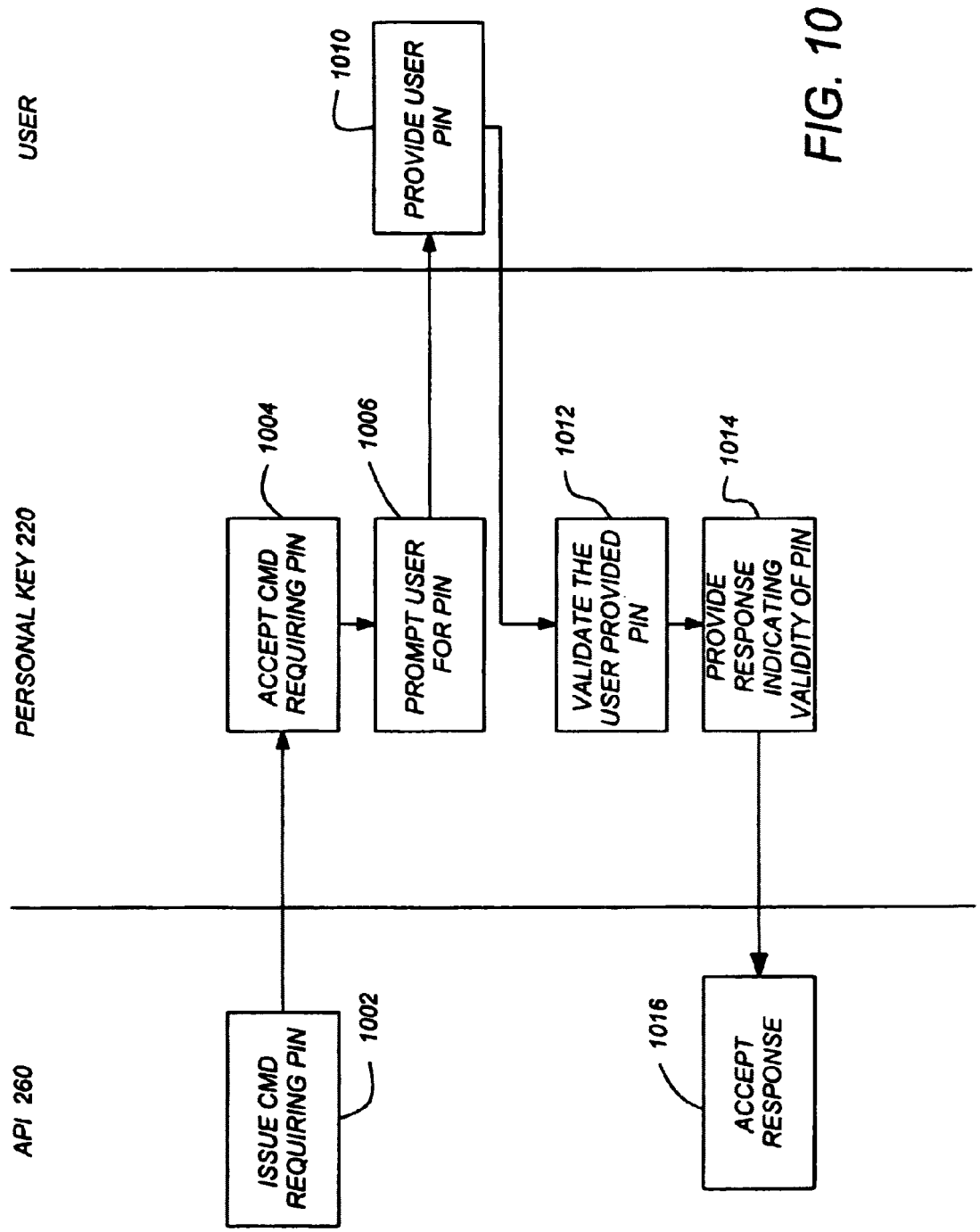
FIG. 10 is a flow chart illustrating an embodiment of the present invention in which the PIN is entered directly into the personal key.

FIG. 10 is a flow chart illustrating an embodiment of the present invention in which the PIN is entered directly into the personal key 200. In block 1002, a command is issued which requires access to the user's PIN, such as the VerifyPIN and ModifyPIN commands listed in Table 6. At block 1004, the personal key 200 accepts the command, and if necessary, prompts the user for the PIN, as shown in block 1006. This may be accomplished with the display 122, one of the output devices 222, or any combination thereof. Preferably, this is accomplished via a communication path distinct and inaccessible from the USB interface 204. Using one of the input device 218 embodiments described above, at block 1010 the user provides the PIN to the personal key 200. Using a value stored in the memory 214, at block 1012 the processor 212 in the personal key 200 validates the user-entered PIN. In one embodiment, this is accomplished by comparing the user-provided value directly with a value stored in the memory 214. At block 1014, the personal key then provides a response indicating the validity of the PIN, which is accepted by the API 260 at block 1016. The response indicates whether the user supplied PIN was valid.

In one embodiment, a biometric sensor 250 is also communicatively coupled to the processor 212. The biometric sensor 250 provides data to the processor 212 and receives commands from the processor 212, as described earlier in this disclosure.

The processor is also optionally communicatively coupled to one or more light emitting devices 616 or other visual display device to provide a visual indication of the activities or status of the personal key 200. The processor 212 may also be communicatively coupled with an aural device to provide a vibrational or audio data to the user of the status or activities of the personal key 200.

CONCLUSION

This concludes the description of the preferred embodiments of the present invention. In summary, the present invention describes a compact, self-contained, personal token. The token comprises a USB-compliant interface releaseably coupleable to a host processing device; a memory; and a processor. The processor provides the host processing device conditional access to data storable in the memory as well as the functionality required to manage files stored in the personal key and for performing computations based on the data in the files. In one embodiment, the personal key also comprises an integral user input device and an integral user output device. The input and output devices communicate with the processor by communication paths which are independent from the USB-compliant interface, and thus allow the user to communicate with the processor without manifesting any private information external to the personal key.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing personal key has been described as providing for electrical communication with the host communication, it is envisioned that such electrical communication includes the optical transfer of data such as is implemented by fiber optics and the like.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A compact personal token, comprising:
    a USB-compliant interface releaseably coupleable to a host processing device;
    a token memory;
    a token processor, communicatively coupled to the token memory and communicatively coupleable to the host processing device via the USB-compliant interface, the token processor for providing the host processing device conditional access to user private data stored in the token memory; and
    a user-input device, communicatively coupled to the token processor by a path distinct from the USB-compliant interface, for accepting an input for processing by the token processor to signal authorization of a token processor operation providing access to the user private data stored in the token memory, the input in response to a message received in the token from the host processing device via the USB-compliant interface invoking the token processor operation, wherein user authentication occurs on the token, the user input device comprising one of:
    a character input device integrated with the personal token, the character input device comprising a wheel having an input position for each character in an input character set; or
    a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

2. The apparatus of claim 1, wherein the path is entirely internal to the token.

3. The apparatus of claim 1, wherein the user private data is designated as requiring authorization before access by an associated identification stored in the memory.

4. The apparatus of claim 1, wherein the input device comprises at least one push-button switch.

5. The apparatus of claim 1, further comprising:
    an output device, communicatively coupled to the processor by a second path distinct from the USB-compliant interface, for prompting a user to provide an authorization of a processor operation.

6. The apparatus of claim 5, wherein the path and the second path are a common path.

7. The apparatus of claim 5, wherein the output device prompts the user to provide an authorization of the processor operation when processor operation requires access to the private data stored in the memory.

8. The apparatus of claim 5, wherein the output device comprises at least one light-emitting device.

9. The apparatus of claim 5, wherein the output device comprises at least one aural reproduction device.

10. The apparatus of claim 5, wherein the output device comprises at least one liquid crystal display (LCD).

11. The apparatus of claim 5, wherein the output device provides an alphanumeric message indicating that user input is required.

12. The apparats of claim 11, wherein the alphanumeric message identifies the processing operation.

13. The apparatus of claim 11, wherein the alphanumeric message identifies a private key.

14. A method of authorizing access to private data stored in a token having a processor communicatively coupled to a host processor via a Universal Serial Bus (USB) interface, comprising the steps of:
    authenticating a user identity in the token;
    accepting a command in the token invoking a token processor operation via the USB interface;
    accepting a user input signaling authorization of the token processor operation via an input device;
    providing the user input to the token processor via a communication path distinct from the USB-compliant interface; and
    processing the user input in the token processor to authorize the invoked token processor operation, wherein the input device comprises one of:
    a character input device integrated with the token, the character input device comprising a wheel having an input position for each character in an input character set; or
    a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

15. The method of claim 14 further comprising the steps of:
    determining if the processor operation requires access to the private data stored in the token; and prompting a user to authorize the processor operation via an output device communicatively coupled to the processor if the processor operation requires access to private data stored in a memory in the token.

16. The method of claim 15 wherein the output device is communicatively coupled to the processor by a second communication path distinct from the USB-compliant interface.

17. The method of claim 16 wherein the first path and the second path are common.

18. The method of claim 16 wherein the step of determining if the processor requires access to a private key stored in the token comprises the steps of:
   determining which data stored in the memory is affected by the processor operation; and
   determining whether the data affected by the processor operation is associated with an identification designating the data as a private key.

19. The method of claim 16 wherein the path is entirely internal to the token.

20. The method of claim 16 wherein the input device is a push-button switch actuatable from an exterior surface of the token.

21. The method of claim 16 wherein the output device comprises at least one light emitting device.

22. The method of claim 16 wherein the output device comprises at least one aural reproduction device.

23. The method of claim 16 wherein the output device comprises at least one liquid crystal display.

24. The method of claim 16 wherein the step of prompting the user to authorize the processor operation via an output device comprises the step of:
   providing an alphanumeric message indicating that user input is required.

25. The method of claim 24 wherein the alphanumeric message identifies the processing operation.

26. The method of claim 24 wherein the alphanumeric message identifies the private data.

27. The method of claim 16 wherein the command is an authorization request including a challenge value and the processor operation is a hash function using the challenge value and the private data.

28. A program storage device, readable by a computer, tangibly embodying at least one program of instructions executable by the computer to perform method steps of authorizing access to private data stored in a token having a processor communicatively coupled to a host processor via a Universal Serial Bus (USB) interface, the method steps comprising the steps of:
   authenticating, in the token, a user identity;
   accepting a command to the token invoking a token processor operation via the USB-compliant interface;
   determining, in the token, if the token processor operation requires access to the private data stored in the token;
   prompting the user to authorize the token processor operation via an output device communicatively coupled to the token processor by a path distinct from the USB-compliant interface if the token processor operation requires access to a private data stored in a memory in the token;
   accepting a user input signaling authentication of the token processor operation via an input device; and
   providing the user input to the token processor via a communication path distinct from the USB-compliant interface, wherein the input device comprises one of:
   a character input device integrated with the token, the character input device comprising a wheel having to input position for each character in an input character set; or
   a first pressure sensitive device actuatable from the exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

29. The program storage device of claim 28, wherein the first path and the second path are common.

30. The program storage device of claim 28, wherein the method step of determining if the processor requires access to a private key stored in the token comprises the steps of:
   determining which data stored in the memory is affected by the processor operation; and
   determining whether the data affected by the processor operation is associated with an identification designating the data as the private key.

31. The program storage device of claim 28 wherein the path is entirely internal to the token.

32. The program storage device of claim 28 wherein the input device is a push-button switch actuatable from an exterior surface of the token.

33. The program storage device of claim 28 wherein the output device comprises at least one light-emitting device.

34. The program storage device of claim 28, wherein the output device comprises at least one aural reproduction device.

35. The program storage device of claim 28 wherein the output device comprises at least one liquid crystal display.

36. The program storage device of claim 28 wherein the method step of prompting the user to authorize the processor operation via an output device comprises the method step of:
   providing an alphanumeric message indicating that user input is required.

37. The program storage device of claim 36 wherein the alphanumeric message identifies the processing operation.

38. The program storage device of claim 36 wherein the alphanumeric message identifies the private data.

39. A compact personal token, comprising:
   a USB-compliant interface releaseably coupleable to a heat processing device;
   a token memory;
   a token processor, coupled to the token memory and communicatively coupleable to the host processing device via the USB-compliant interface, the token processor for providing the host processing device conditional access to store and retrieve data storable in the token memory, the data including a personal identification private to the user; and
   a user input device, communicatively coupled to the token processor by a path distinct from the USB-compliant interface, for accepting a user input describing the personal identification, the user input device for authenticating by the token the personal identification private to the user; the user input device comprising one of:
   a character input device integrated with the personal token, the character input device comprising a wheel having an input position for each character in an input character set; or a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

40. A compact personal token, comprising:
a USB-compliant interface releaseably coupleable to a heat processing device;
a memory;
a processor, coupled to the memory and communicatively coupleable to the host processing device via the USB-compliant interface, the processor for providing the host processing device conditional access to store and retrieve data storable in the memory, the data including a personal identification private to the user; and
a user input device, communicatively coupled to the processor by a path distinct from the USB-compliant interface, for accepting a user input describing the personal identification, the user input device comprising a character input device,
the character input device comprising a wheel having an input position for each character in an input character set.

41. The apparatus of claim 40, where each character is selected by depression of the wheel.

42. A method of authentication using a token having a processor communicatively coupled to a host processor via a Universal Serial Bus (USB) compliant interface, comprising the steps of:
accepting a command in the token invoking a token processor operation via the USB-compliant interface;
determining if the token processor operation requires access to the personal identification storable in a memory of the token;
determining if the personal identification is stored in the memory of the token;
prompting the user to enter a personal identification if the token processor operation requires access to the personal identification and the personal identification is not stored in the memory of the token;
accepting a user input comprising a personal identification via an input device;
authenticating in the token the user input comprising a personal identification via an input device; and
providing the user input to the processor via a communication path distinct from the USB-compliant interface, wherein the input device comprises a first pressure sensitive device actuatable from an exterior side of the token, and a second pressure sensitive device actuatable from an exterior side of the token, wherein actuation of the first pressure sensitive device selects a character from said input character set, and actuation of the second pressure sensitive device enters the character as at least a portion of the personal identification.

43. The method of claim 42 wherein the step of prompting the user to enter the personal identification number comprises the step of activating a user output device via a second communication path distinct from the USB compliant interface.

44. The method of claim 42, wherein the input device comprises a character input device.

45. A method of authentication using a token having a processor communicatively coupled to a host processor via a Universal Serial Bus (USB) compliant interface, comprising the steps of:
accepting a command in the token invoking a processor operation via the USB-compliant interface;
determining if the processor operation requires access to the personal identification storable in a memory of the token;
determining if the personal identification is stored in the memory of the token;
prompting the user to enter a personal identification if the processor operation requires access to the personal identification and the personal identification is not stored in the memory of the token;
accepting a user input comprising a personal identification via an input device;
providing the user input to the processor via a communication path distinct from the USB-compliant interface, wherein the input device comprises a character input device, the character input device comprising a wheel having an input position for each character in an input character set.

46. The method of claim 45 wherein each character is selected by depression of the wheel.

47. A compact personal token, comprising:
a USB-compliant interface releaseably coupleable to a host processing device;
a token memory;
a token processor, communicatively coupled to the token memory and communicatively coupleable to the host processing device via the USB-compliant interface, the token processor for providing the host processing device conditional access to user private data storable in the token memory; and
a user input device, communicatively coupled to the token processor by a path distinct from the USB-compliant interface, the user input device for signaling authorization of a token processor operation invoked by a message received in the token via the USB-compliant interface, wherein the token authentication user identity, the user input device comprising one of:
a character input device integrated with the personal token, the character input device comprising a wheel having an input position for each character in an input character set; or
a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

48. The apparatus of claim 47 wherein the user input device is configured to control an operation of the processor.

49. The apparatus of claim 47 wherein the operation comprises an operation selected from the group comprising:
an encryption operation; and
a decryption operation.

50. The apparatus of claim 47 wherein the operation comprises a digital signature operation using a private key stored in the memory.

51. The apparatus of claim 47 wherein the input device comprises at least one push-button switch.

52. The apparatus of claim 47 further comprising an output device, communicatively coupled to the processor by path distinct from the USB-compliant interface, for providing information regarding the operation of the processor.

53. The apparatus of claim 52 wherein the output device comprises at least one light emitting device.

54. The apparatus of claim 52 wherein the output device comprises at least one liquid crystal display.

55. The apparatus of claim 52 wherein the output device comprises at least one aural output device.

56. A method of authorizing access to private data stored in a token having a processor communicatively in coupled to a host processor via a Universal Serial Bus (USB) interface, comprising the steps of:
   authenticating a user identity in the token;
   accepting a command in the token invoking a token processor operation via the USB-compliant interface;
   accepting a user input to control the token processor operation via an input device; and
   providing the user input to the token processor via a communication path distinct from the USB-compliant interface, wherein the input device comprises one of:
      a character input device integrated with the token, the character input device comprising a wheel having an input position for each character in an input character set; or
      a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

57. The method of claim 56 wherein the operation comprises an operation selected from the group comprising:
   an encryption operation;
   a decryption operation; and
   a digital signature operation using a private key.

58. The method of claim 56 further comprising the step of prompting the user to control the processor operation via an output device communicatively coupled to the processor by a second path distinct from the USB-compliant interface.

59. The method of claim 58 wherein the path and the second path are common.

60. The method of claim 58 wherein the output device is selected from the group comprising:
   a light emitting device;
   a liquid crystal display; and
   an aural reproduction device.

61. A compact personal token, comprising:
   a USB-compliant interface releaseably coupleable to a heat processing device;
   a token memory;
   a token processor, communicatively coupled to the token memory and communicatively coupleable to the host processing device via the USB-compliant interface, the token processor for providing the host processing device conditional access to data storable in the memory; the token processor for authenticating a user identity;
   a user output device, communicatively coupled to the USB-compliant interface, for providing an indication of a data signal from the USB-compliant interface; and
   a user input device for receiving an input to signal authorization to provide the heat processing device access to said data storable in the memory, the user input device comprising one of:
      a character input device integrated with the personal token, the character input device comprising a wheel having an input position for each character in an input character set; or
      a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

62. A compact personal token, comprising:
   a USB-compliant interface releaseably coupleable to a host processing device;
   a token memory;
   a token processor, communicatively coupled to the token memory and communicatively coupleable to the host processing device via the USB-compliant interface, the token processor for providing the host processing device conditional access to the data storable in the token memory, the token processor authenticating a user identity;
   a user output device, communicatively coupled to the token processor; and
   a user input device for receiving an input to signal authorization to provide the host processing device access to said data storable in the memory, the user input device comprising one of:
      a character input device integrated with the personal token, the character input device comprising a wheel having an input position for each character in an input character set; or
      a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive device integrated with the token.

63. The apparatus of claim 62 wherein the user output device is coupled to the processor by a path distinct from the USB-compliant interface.

64. The apparatus of claim 62 wherein the user output device is configured to indicate the operation of the processor.

65. The apparatus of claim 62 wherein the operation comprises an operation selected from the group comprising:
   an encryption operation;
   a decryption operation; and
   a digital signature operation using a private key.

66. The apparatus of claim 62 wherein the user output device is selected from a group comprising:
   at least one light emitting device;
   at least one liquid crystal display; and
   at least one aural device.

67. The apparatus of claim 62 further comprising an input device, communicatively coupled to the processor by path distinct from the USB-compliant interface, for providing information for the operation of the processor.

68. A method of authorizing access to private data stored in a token having a processor communicatively coupled to a host processor via a Universal Serial Bus (USB) interface, comprising the steps of:
  authenticating in the token a user identity;
  accepting a command in the token invoking a token processor operation via the USB-compliant interface; and
  signaling the token processor operation, via a user output device communicatively coupled to the token processor via a communication path distinct from the USB-compliant interface;
  receiving, at a user input device of the token, an input signaling authorization of the token processor operation, wherein the user input device comprising one of:
    a character input device integrated with the personal token, the character input device comprising a wheel having an input position for each character in an input character set; or
    a first pressure sensitive device actuatable from an exterior side of the token, and a second pressure sensitive device actuatable from the exterior side of the token, wherein actuation of the first pressure sensitive device selects a character from said input character set, and actuation of the second pressure sensitive device enters the character, the first and second pressure sensitive devices integrated with the token.

69. The method of claim 68 wherein the operation comprises an operation
  selected from the group comprising
    an encryption operation;
    a decryption operation; and
    a digital signature operation using a private key.

70. The method of claim 68 wherein the user output device is selected from the group comprising:
  at least one light emitting device;
  at least one liquid crystal display; and
  an aural device.

* * * * *